Figure 1:
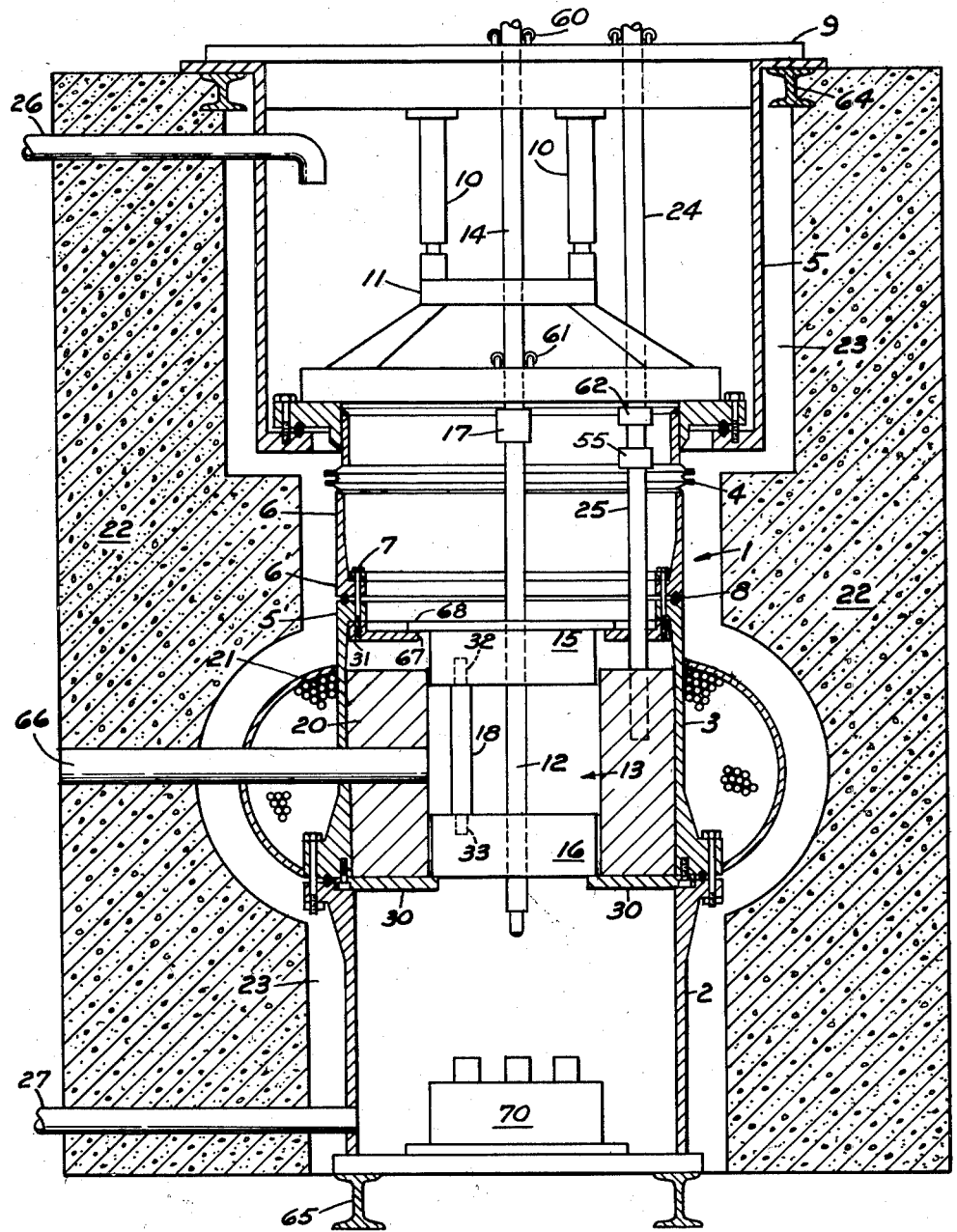

INVENTORS
Henry W. Newson
Elbert P. Epler
Thomas E. Cole
Eugene P. Wigner
BY
ATTORNEY

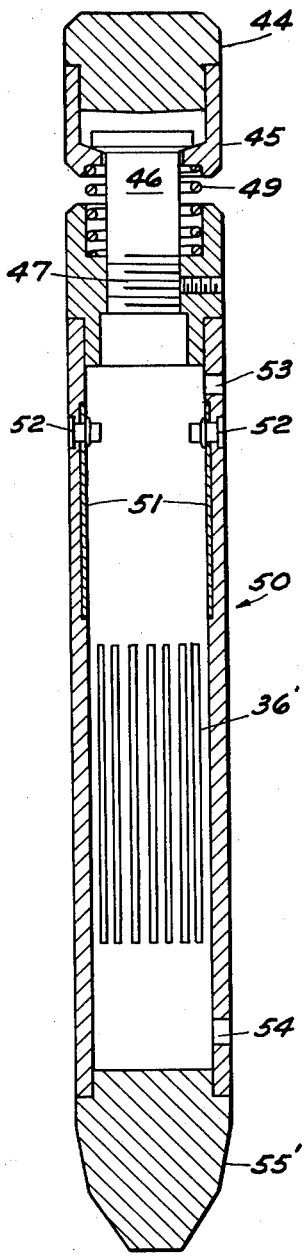
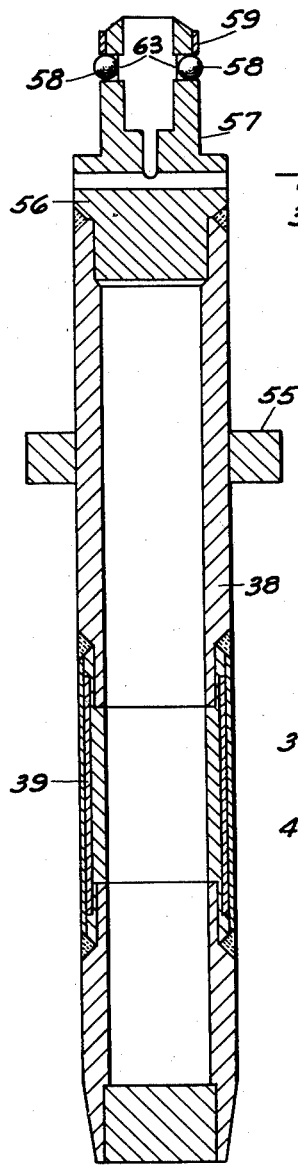
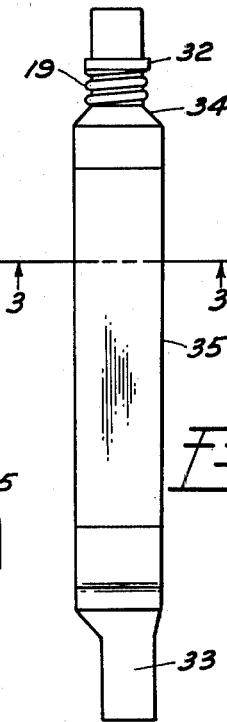
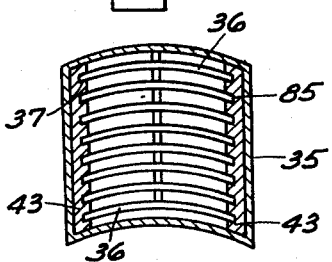
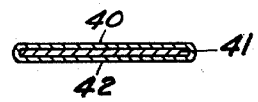

INVENTORS
Henry W. Newson
Elbert P. Epler
BY Thomas E. Cole
Eugene P. Wigner
ATTORNEY

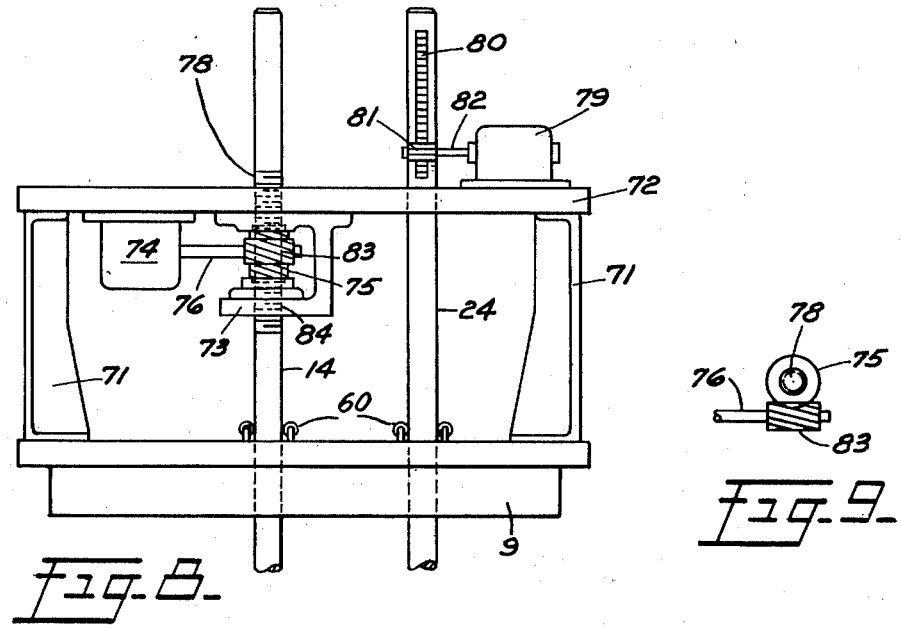
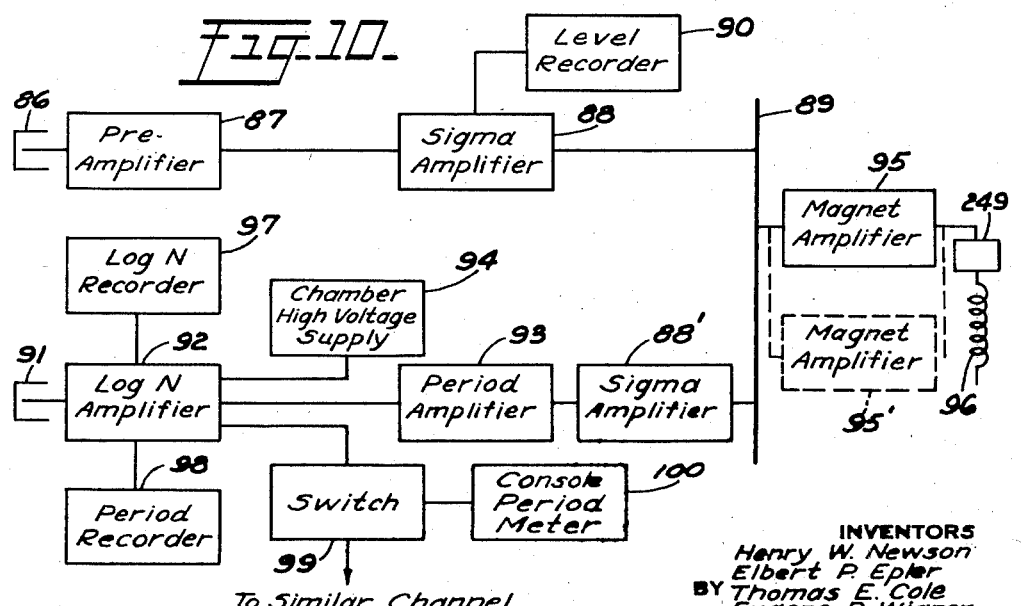

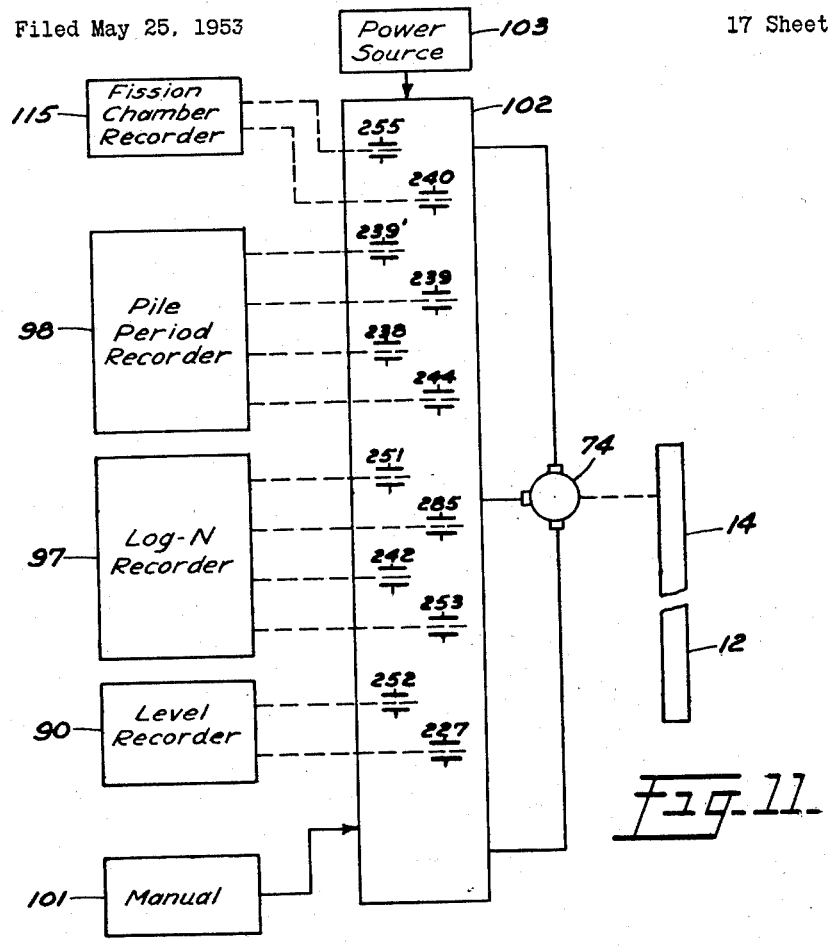
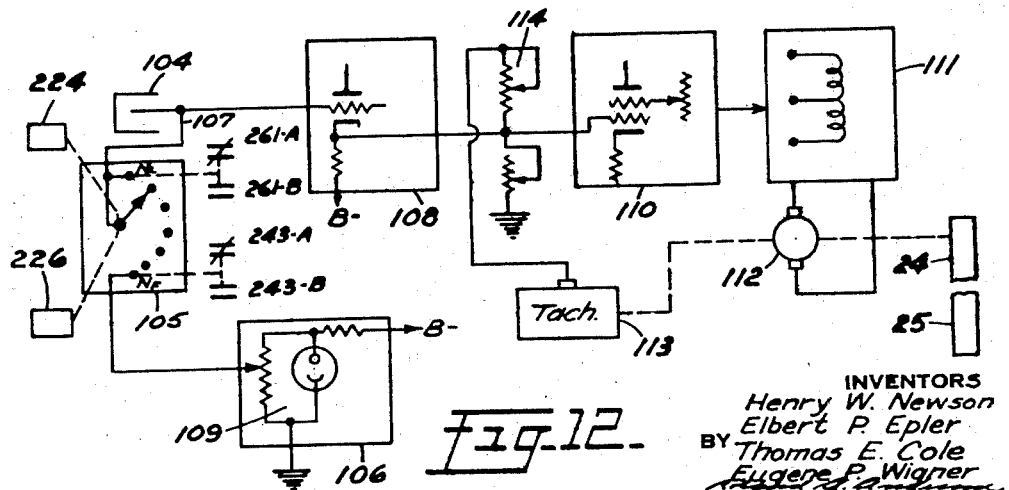

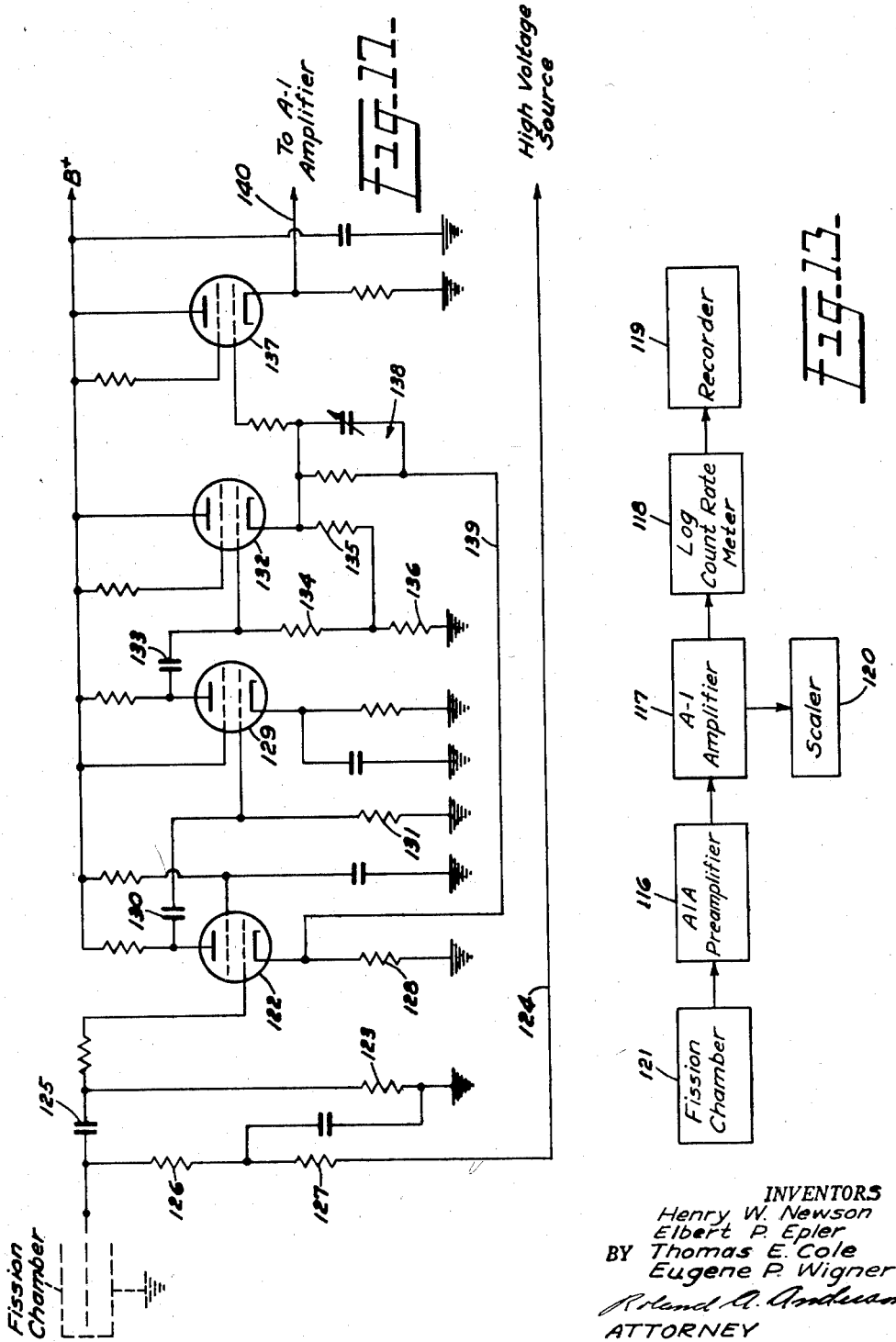

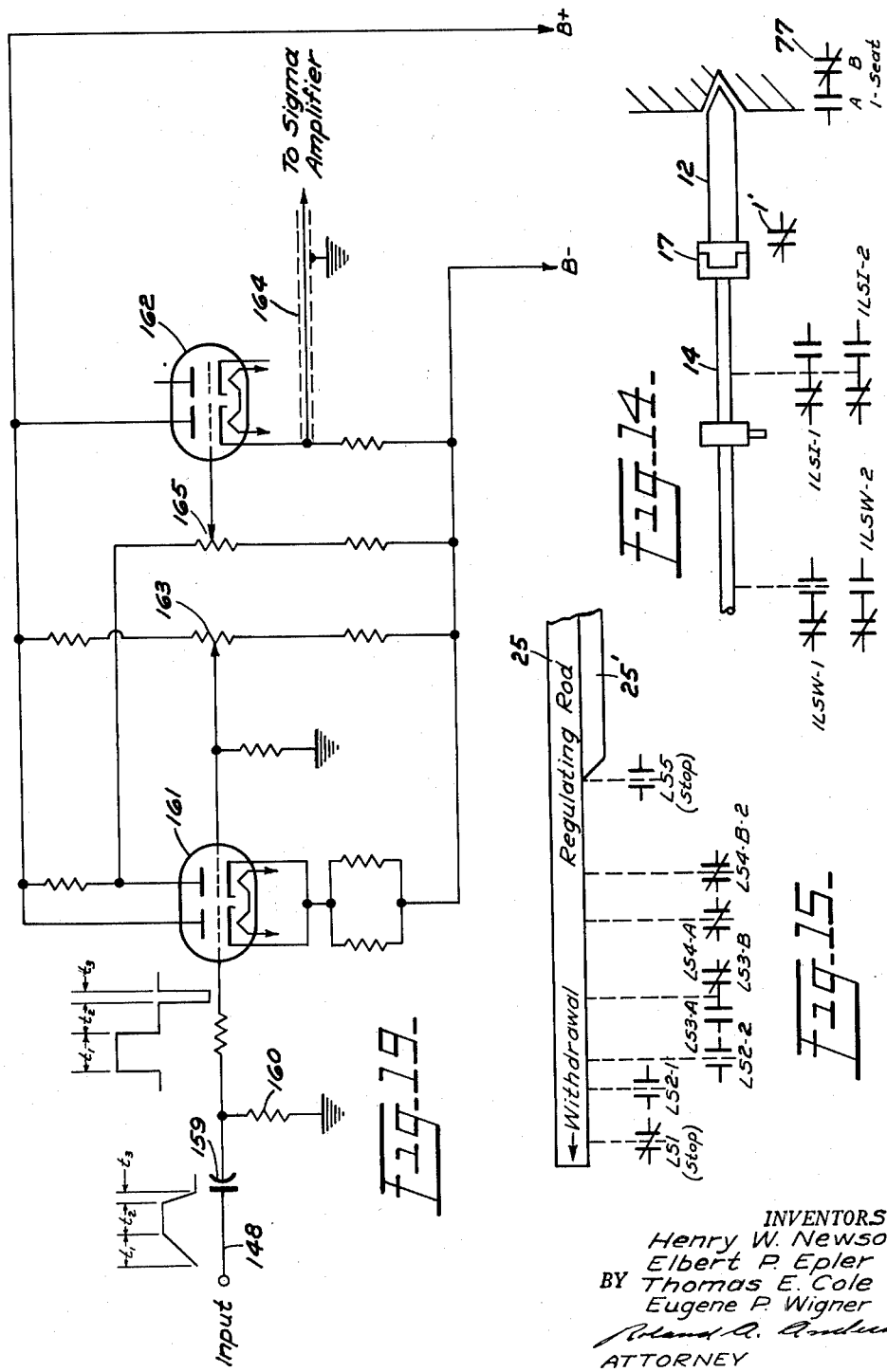

INVENTORS
Henry W. Newson
Elbert P. Epler
Thomas E. Cole
Eugene P. Wigner
BY
ATTORNEY INVENTORS
Henry W. Newson
Elbert P. Epler
BY Thomas E. Cole
Eugene P. Wigner
ATTORNEY

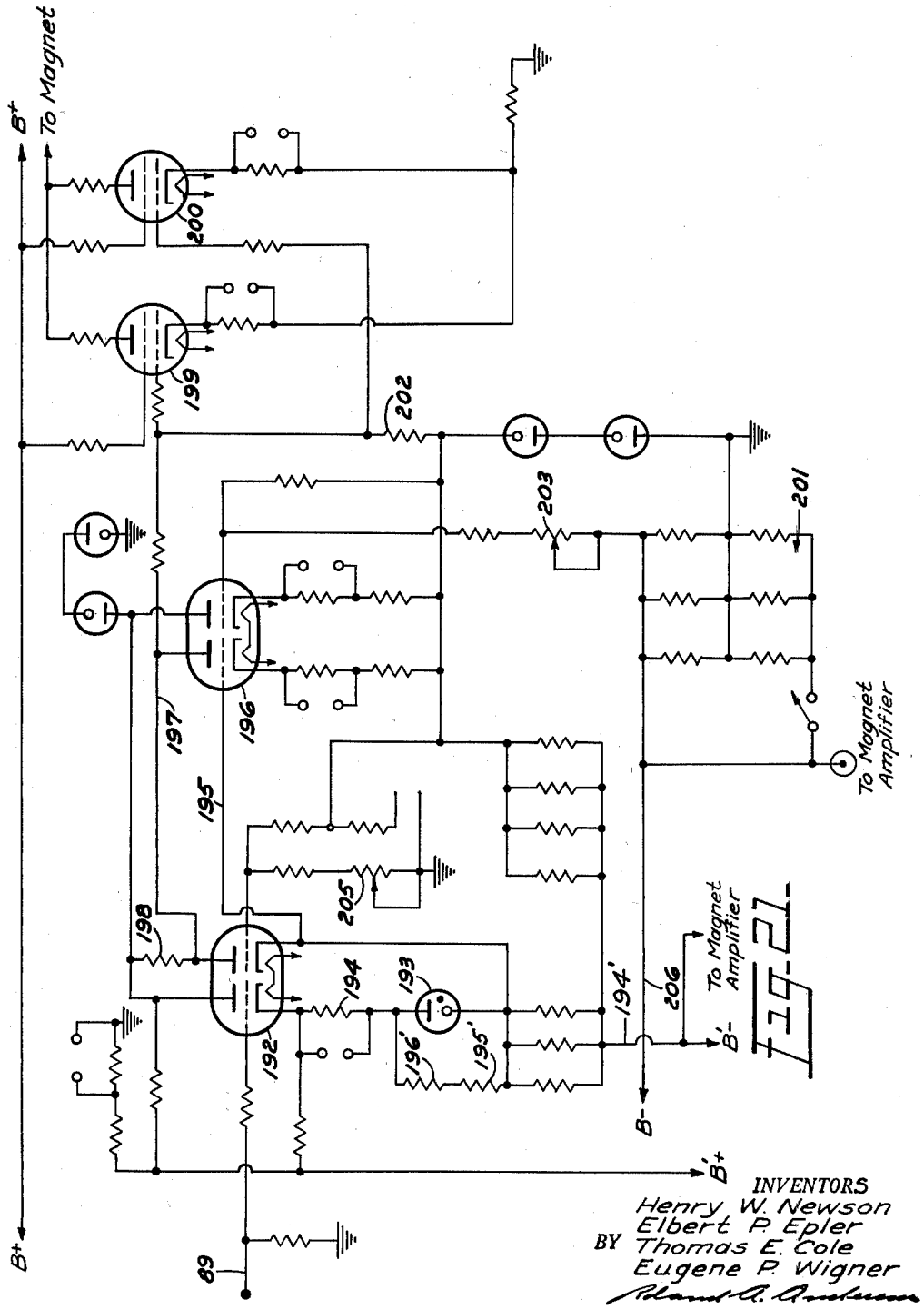

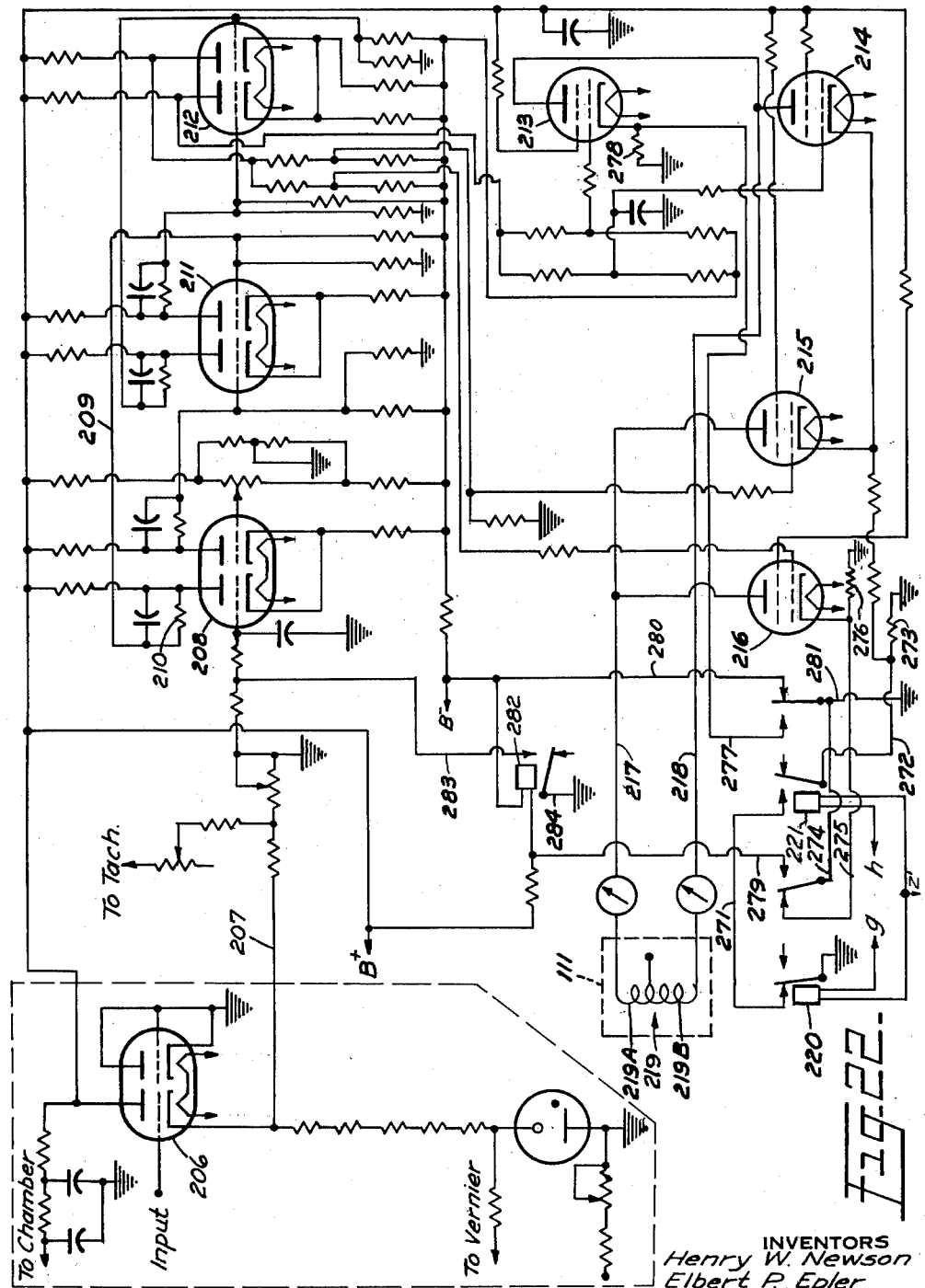

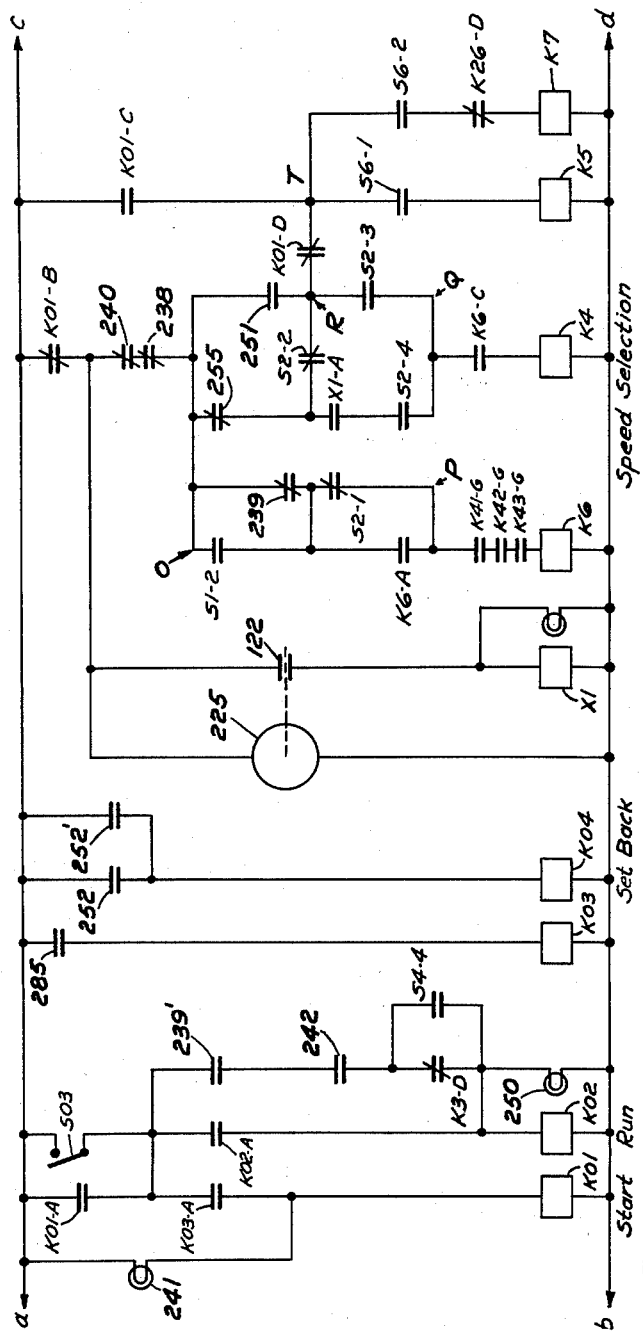

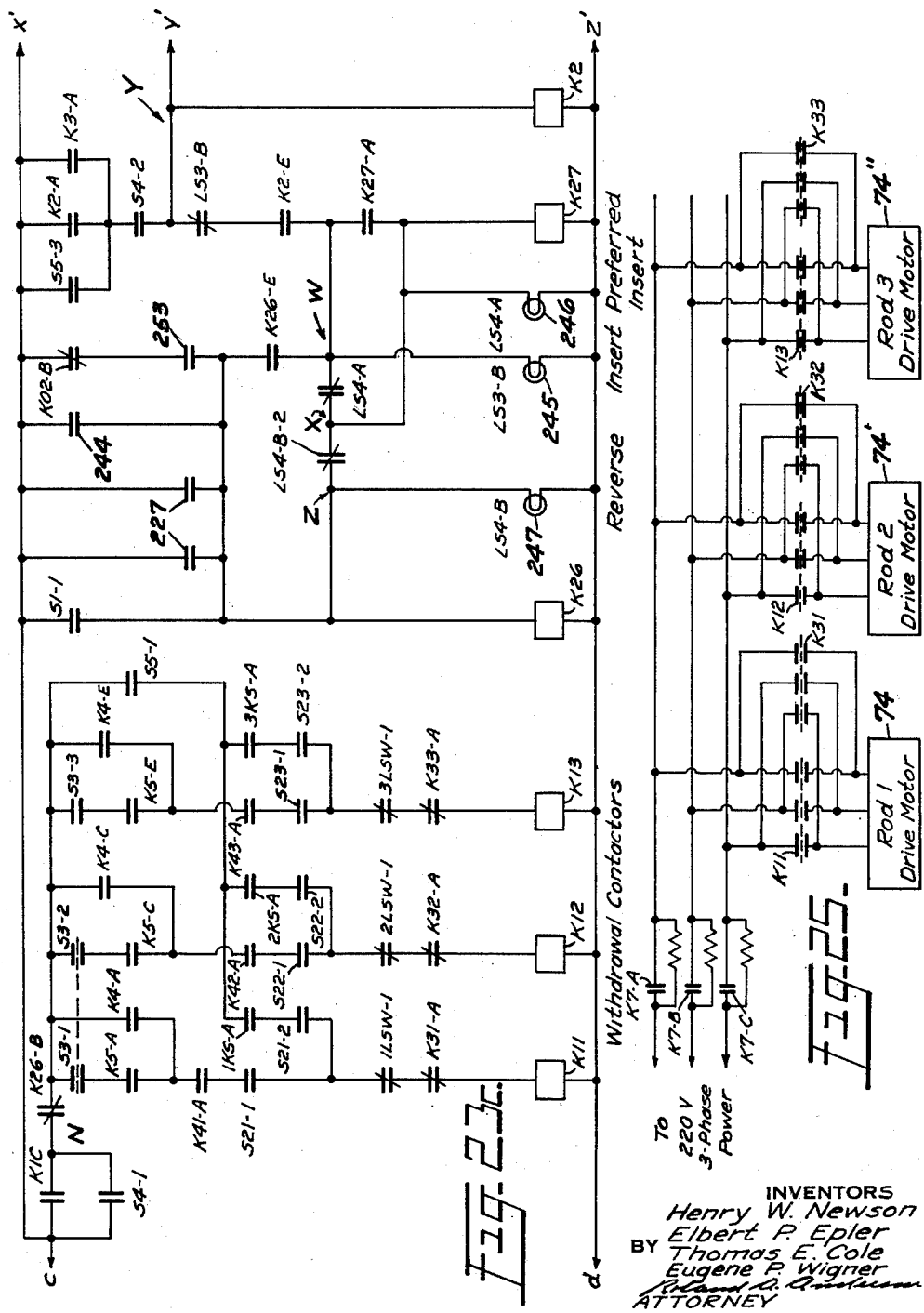

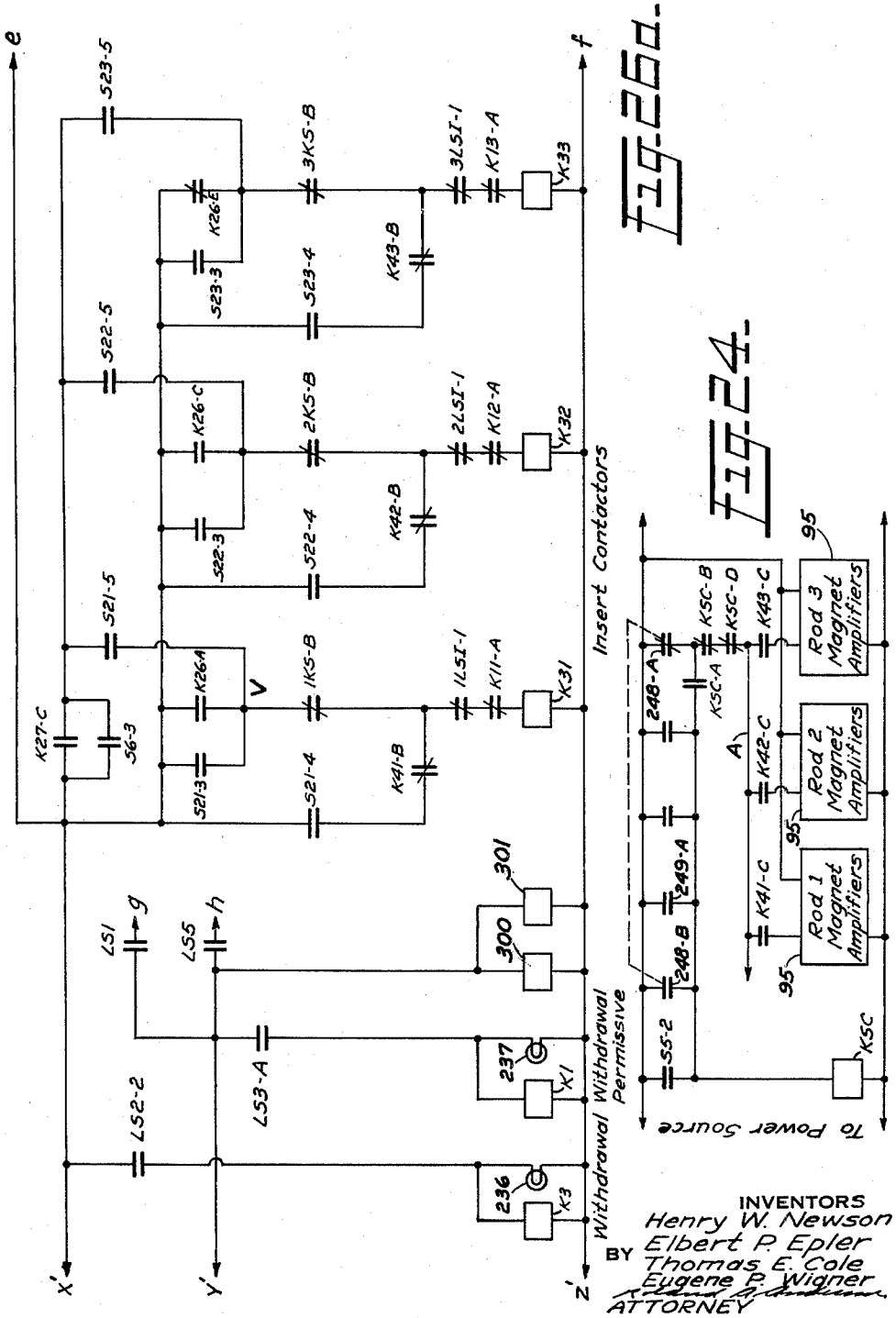

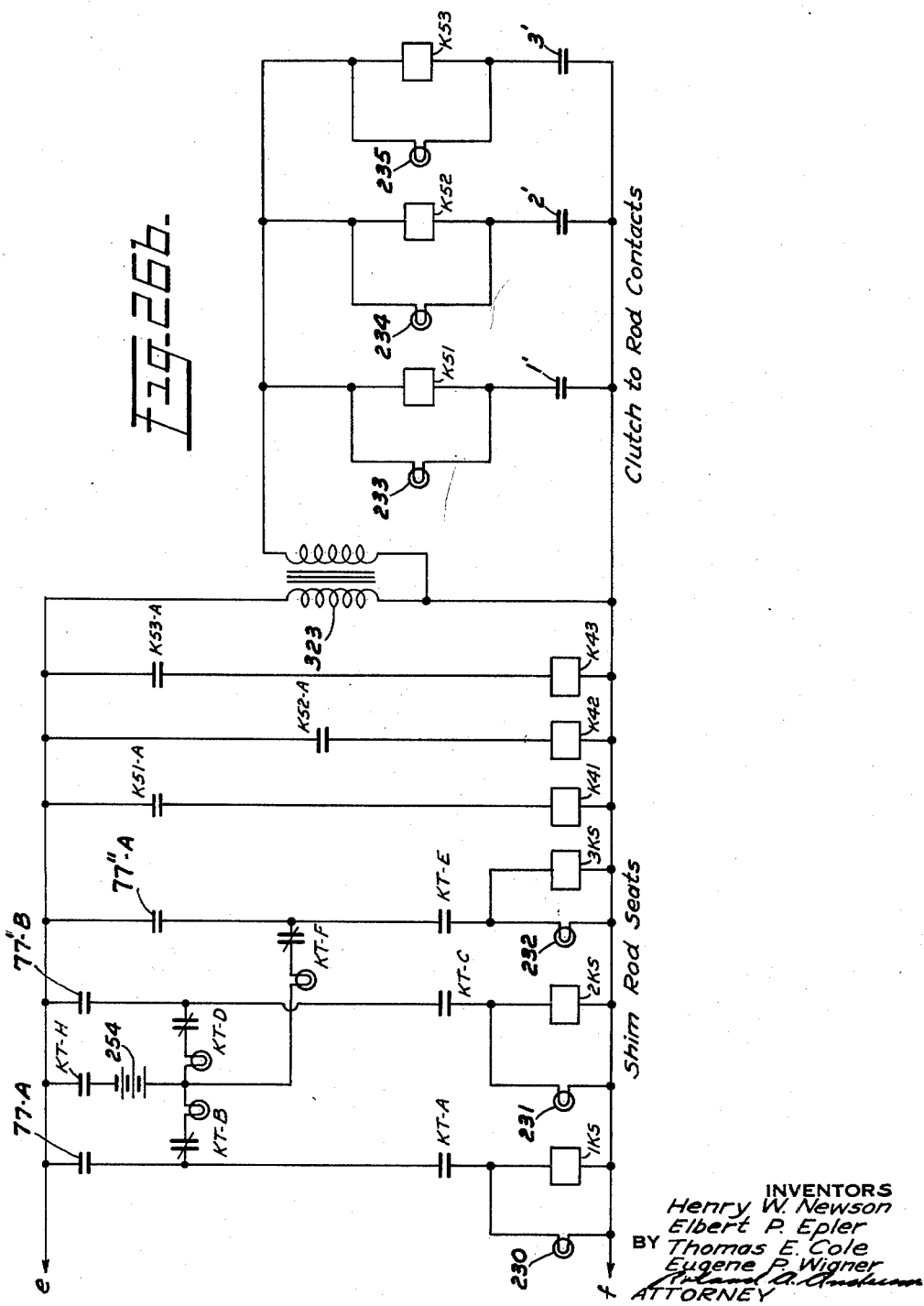

INVENTORS
Henry W. Newson
Elbert P. Epler
Thomas E. Cole
Eugene P. Wigner
ATTORNEY

United States Patent Office 2,985,574
Patented May 23, 1961

2,985,574
OVERALL CONTROL SYSTEM FOR HIGH FLUX PILE

Henry W. Newson, Durham, N.C., Eugene P. Wigner, Princeton, N.J., and Elbert P. Epler and Thomas E. Cole, Oak Ridge, Tenn., assignors to the United States of America as represented by the United States Atomic Energy Commission Filed May 25, 1953, Ser. No. 357,216

2 Claims. (Cl. 204—193.2)

Our invention relates to control systems and more particularly to a system for controlling the start-up and operation of a high flux nuclear reactor or pile, and is especially suited for control of such piles as those disclosed in the prior co-pending applications of Wigner, S.N. 314,595, filed October 14, 1952, United States Patent 2,831,806, issued April 22, 1958; and Winters et al., S.N. 321,078, filed November 18, 1952, United States Patent 2,945,794, issued July 19, 1960.

In the prior art it was found that such materials as plutonium-239, uranium-233, and uranium-235 had the property of fission. That is, upon being subjected to the action of a particle such as a neutron, the nucleus would split into fragments releasing other neutrons which, upon encountering additional atoms of the material, would induce further fission. It was also known that the probability of fission from neutron absorption increased as the energy of the neutron approached thermal equilibrium. Further, it was established that when the point was reached where the neutrons being produced through fission equaled or exceeded those which were consumed or lost, the mass had reached the critical state, and a self-sustaining chain reaction existed. Arrangements which tended to increase the opportunity for the chain reaction and which facilitated control thereof, were devised. They included the arrangement of fuel into a pattern called a lattice or core, the use of a moderator to reduce the energy level of high energy neutrons and increase the probability of fission, and the provision of a reflector to direct the neutrons back into the active mass and limit neutron loss. This arrangement was known as a reactor or pile, and to prevent the activity thereof from rising to dangerous proportions, neutron absorbers were employed for removing a portion of the available neutrons from the reaction. (See "Source Book of Atomic Energy," by Glasstone, published 1950 by D. Van Nostrand Co., Inc., of New York, N.Y., pages 335, 377, 381 and 387; "The Science and Engineering of Nuclear Power," edited by Goodman, and published in 1947 by Addison-Wesley Press, Inc., of Cambridge, Mass., page 99.)

If a neutron induced chain reacting pile were built to exactly the critical dimensions, it would maintain whatever neutron density was present, but would not provide for increasing it. In order to be able to cause the neutron level to rise, so that the power produced may be increased, it is necessary to build a pile larger than the critical size. With such a pile, it is possible to control the neutron density by the insertion or removal of neutron absorbers. Thus, by removing the absorbers, the pile will become over critical and the neutron level will rise; by inserting the absorbers, the pile may be made sub-critical, and the neutron density will fall. For a particular position of the absorbers the pile will be just critical, and the power level will maintain itself; the pile will then run at constant power.

A convenient quantity often used in speaking of the control of a nuclear chain reaction is the reactivity, $\rho$, represented by the following equation:

$$\rho = \frac{k_{\text{eff}} - 1}{k_{\text{eff}}}$$

where $k_{\text{eff}}$ is the effective multiplication constant of the reactor. For a given system the period of rise or fall of reactor fission rate is related to $\rho$ by the reactor kinetic equations. In these equations the reactor is shown to be self-sustaining, in the steady state, by the establishment of a neutron balance.

It is a characteristic of fission, particularly of uranium, that a certain fraction of the fission neutrons, $\beta(\approx .7\%)$, do not appear immediately after fission but are emitted after a delay of the order of seconds. As the delayed emitters decay, they release neutrons which help maintain the reaction. Hence, the time of exponential rising or falling of neutron density can be controlled by them provided the excess reproduction factor does not exceed the fraction represented by the delayed neutrons.

For $\rho$ negative, the neutron flux will decrease on a period largely determined by the half-lives of the delayed emitters. For $\rho$ positive, but small compared to $\beta$, the neutron flux will increase on a period largely determined by the half-lives of the delayed neutron emitters. As $\rho$ approaches $\beta$, in sign and magnitude, the period becomes shorter, and for $\rho$ equal to $\beta$ the chain reaction can be sustained without the contribution of the delayed emitters. This condition is termed "prompt" critical. For $\rho$ greater than $\beta$ the period becomes even shorter.

It has been determined that an available $\rho$ of about $+.003$ is sufficient to permit the power level to be changed over wide ranges in reasonable lengths of time, with considerable latitude before reaching periods so short that extreme demands are put on the safety system.

The nuclear reactors of the prior art were generally of the heterogeneous type wherein slugs of naturally occurring uranium or aluminum clad uranium metal were positioned at spaced intervals in a moderator, such as graphite, to form a lattice. When sufficient $k$ (the reproduction constant or multiplication factor which must exceed 1 and be of sufficient size to sustain a chain reaction of neutron induced fissions) was built into the resulting pile, a chain reaction could be sustained. Depending upon the heat generated, permissible neutron absorption and other factors, reactors of this type were either air cooled or water cooled and, for greater efficiency and neutron economy, they were enclosed in a reflector such as a layer of graphite. Surrounding the reflector would be a biological shield or enclosure of concrete or other suitable material for the protection of personnel. Control rods having neutron absorbing sections were provided for positioning in the active portion of the pile and in the walls of the reactor, and were movable into the region of neutron flux concentration for controlling the neutron density and thus the operation of the pile. This problem also included he control of the period of the pile. Since the period of a pile is the time required for an increase or decrease of the number of neutrons by the factor of $e$ (which is of the order of 2.72), it is apparent that the rate of rise or fall of the pile may be of importance to the operator. If the period becomes unduly short, the pile flux may multiply too rapidly, and the level rise too fast.

However, these types of chain reacting piles were inherently sluggish, since in most of them the excess $k$ was less than the fraction of the delayed neutrons so that it was impossible to achieve a period much shorter than a second. With its relatively slow rise in power, it was feasible to bring this type of reactor up to full power by manual manipulation of the control circuits for removal of the absorbers or control rods. The actions of the operator were guided by observation of visible indicators, particularly the galvanometer, which was operated from a neutron chamber positioned in one of the pile holes, and was responsive to the level of neutron flux. Thus, control of such a pile created no serious problems requiring unusual automatic electronic control circuits for its normal operation and the maintenance of the power level, although certain automatically operated equipment was provided on a stand-by basis for operation of safety rods in the event of an emergency.

This situation does not obtain for a pile with fuel of highly enriched uranium, plutonium, or other suitable fissionable material, since the available $k$ is very much higher than in the uranium-graphite type of pile which was conventional to the prior art. Use of enriched fuel makes it possible to build a large excess $k$ into the pile to counteract effects of temperature coefficients, depletion of fuel elements, and such losses as xenon poison. For instance, in the newer types of water cooled and moderated high flux piles it may be desirable to have an effective excess $k$ of up to 30%. Since some safety factors must be provided in the available rods, these rods would necessarily account for about 45% of the effective $k$ when they are inserted in the pile. These rods will then need to be withdrawn at a substantial rate of speed in order to keep the start-up time within reasonable limits.

The safety system for such a reactor must provide a large part of the protection against operational hazards. The danger involved in operating such a reactor arises from the possibilities that, (1) the power level of the reactor may rise to such a point that the shielding is no longer adequate for protection of the personnel from radiation, or (2) the power may rise to such a high level that the heat transfer system will allow the fuel plates to melt or vaporize, thus damaging the reactor and releasing fission products which would contaminate the water in the pool and the air around it, and thereby constitute a radiation hazard to personnel.

With the $k$ of the high flux pile being very much larger than that of the conventional uranium-graphite reactors in order to provide the excess reactivity to take care of losses, any control system for such a reactor not only must be able to maintain the power at a given level, but when necessary, must also be able to overcome quickly all the excess reactivity. The speed with which the controls must act depends upon the maximum rate at which the reactor can rise in power. For instance, in a clean, cold reactor some mishap might permit the rods to be withdrawn at their maximum rate, which will assume to be equivalent to $\Delta k/k \approx .1\%$ per second. In the first few minutes the neutron level will rise only by a factor of $\sim 100$, but at the end of this time the reactor will be super-critical and on a rising period of approximately 10 seconds. In a few more seconds the period will be 1 second. It may be determined that the minimum period expected before the power goes above the normal operating level will be about $\frac{1}{30}$ of a second. Such a period must be countered by safety devices capable of a 30 m. second response. Even with this speed of response the power would momentarily rise to about three times normal overload power, or to about four times operating power. It is thus apparent that the absorbers or control rods must not be withdrawn too rapidly, but another condition arises when re-starting the reactor after a short shutdown. In that situation the time available is limited by xenon growth so that the absorbers or control rods must be withdrawn as quickly as possible. In order to meet these contradictory requirements, a control system must limit the high rate of withdrawal to an equivalent $\Delta k/k$ of .1% per second.

Thus for rates of change of $k$ consistent with reasonable start-up times, "prompt" critical may be reached before accurate instruments are in range to indicate the flux. The short periods on which the reactor then rises may preclude corrective action by the pile operator in time to avert a disaster. To meet this problem it is necessary to make provision not only for the reduction of the activity of the pile when the flux reaches a predetermined level, but also for the condition where a dangerous increase in $k$ at low level may result in a very rapid change in pile period.

Further, while high level safety circuits provide very effective protection for a pile operating at a level near the trip level, there is always a time lag in the operation of these circuits and this could permit the pile to go to a dangerously high power, if the pile period is very short when the trip level is reached. Such situation is most likely to occur during the start-up of a pile that has a large amount of excess reactivity.

Applicants, with a knowledge of these problems, have for an object of their invention the provision of a control system for a pile which is capable of very short periods.

Applicants have, for another object of their invention, the provision of a control system for a high flux pile which acts in response to the level of the pile to automatically limit its further rise, maintain its level, or lower the neutron density thereof.

Applicants have, as another object of their invention, the provision of a control system for a high flux neutron pile which is responsive to the rate of change of the level thereof for automatically limiting the further rise of such pile.

Applicants have, as another object of their invention, the provision of a control system for a high flux neutron reactor which is responsive to the differential of the logarithm of the pile period in order to provide adequate control of the operation of the reactor over a range beginning at low flux levels and extending up to full power.

Applicants have, as another object of their invention, the provision of a control system for a high flux pile which will permit limited withdrawal of the control rods manually in response to a radiation operated control arrangement.

Applicants have, as another object of their invention, the provision of a manually operated control system for a high flux pile which is limited in its control functions by automatically operated circuits responsive to pile period and level.

Applicants have, as another object of their invention, the provision of a high flux reactor control system which provides both safety control and operational control.

Applicants have, as another object of their invention, the provision of a high flux neutron pile control system employing absorbers for insertion into, or removal from, the pile in response to pile level and period, and for release to drop by gravity into the pile when an emergency arises.

Applicants have, as a further object of their invention, the provision of a control system for a high flux pile which includes at least one regulating rod type of absorber responsive to changes in pile level for movement into or out of the pile to overcome such changes and maintain a predetermined operating level for the pile.

Other objects and advantages of our invention will appear from the following specification and accompanying drawings, and the novel features thereof will be particularly pointed out in the annexed claims.

Figure 16:
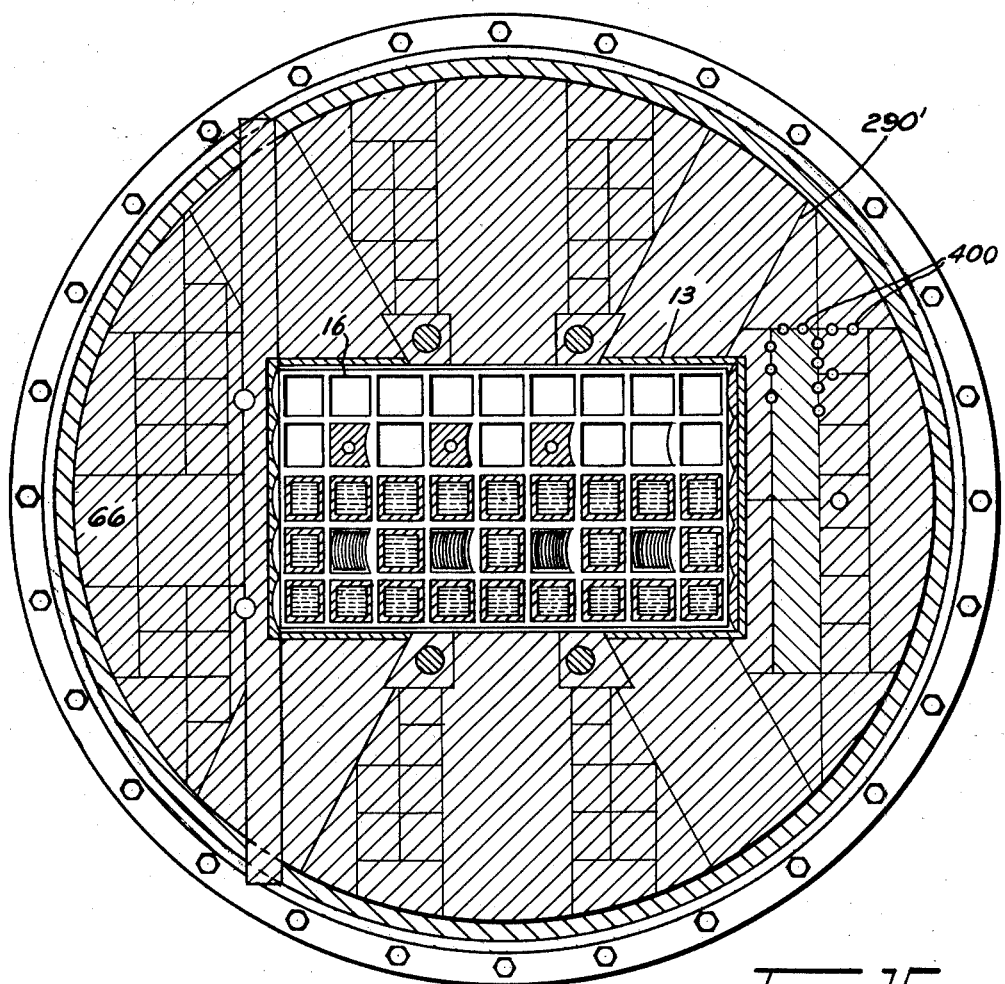
Figure 7:
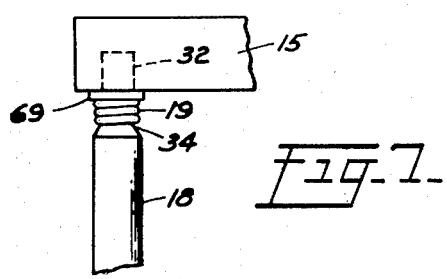
Figure 18:
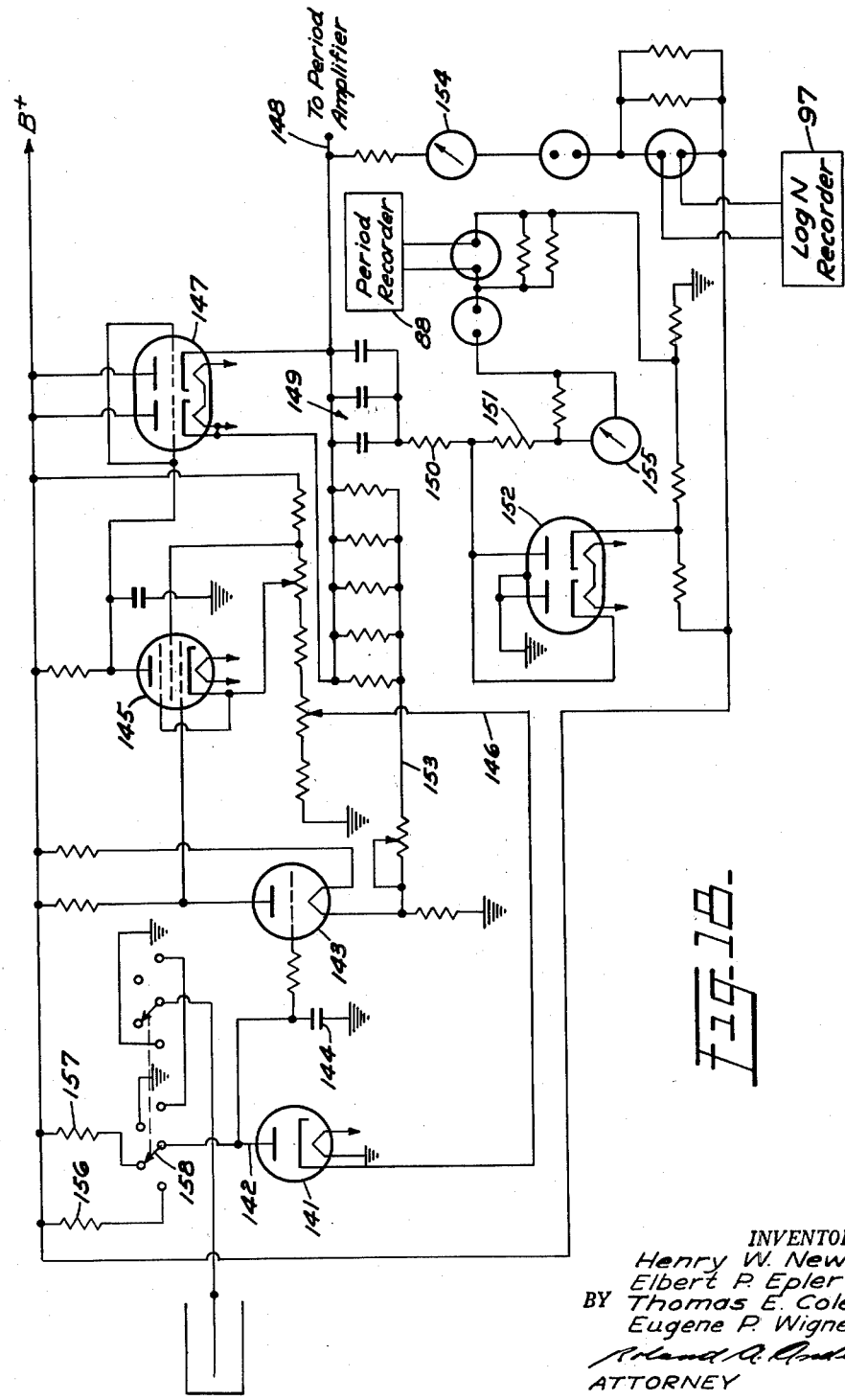
Figure 20:
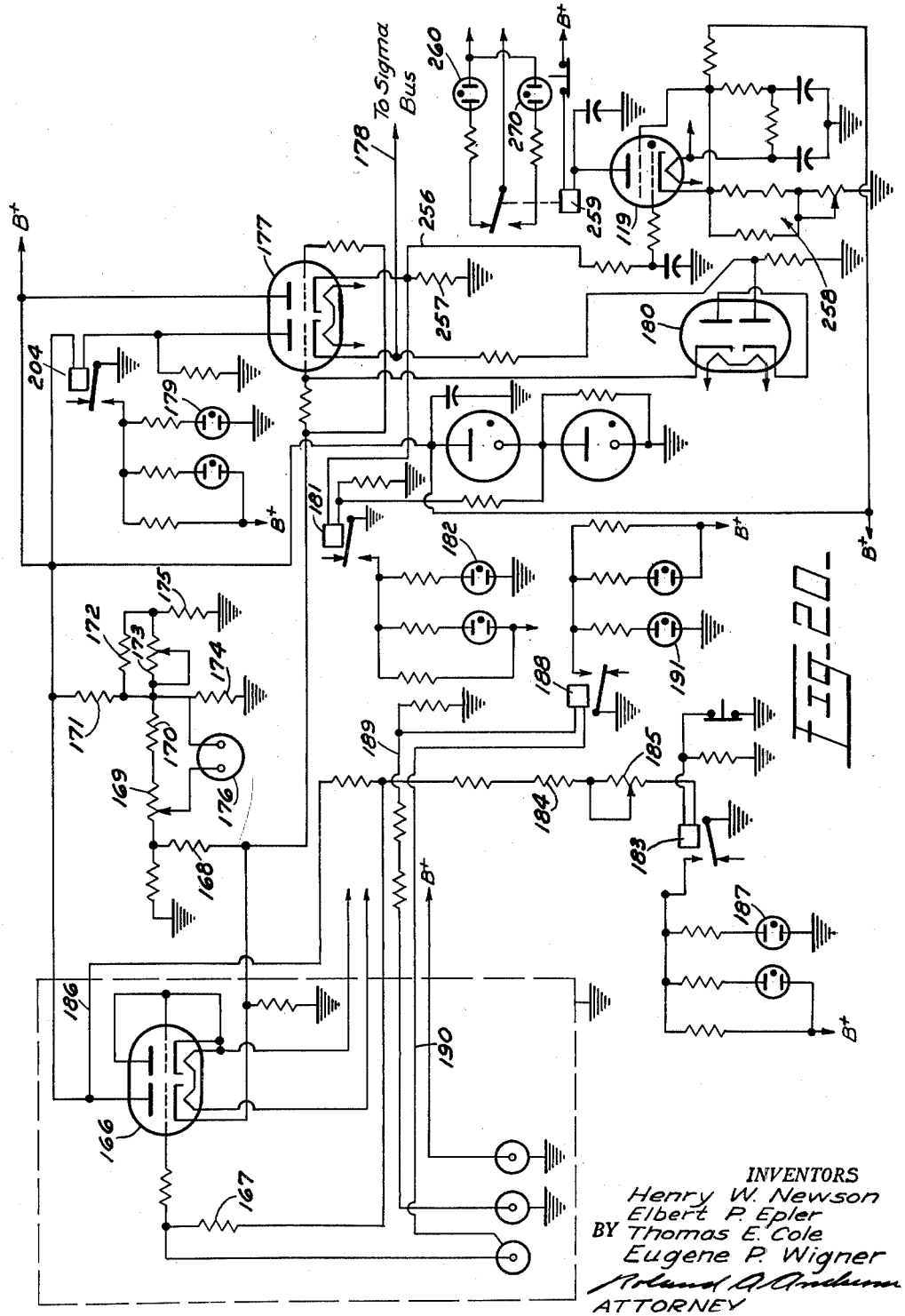
Figure 23A:
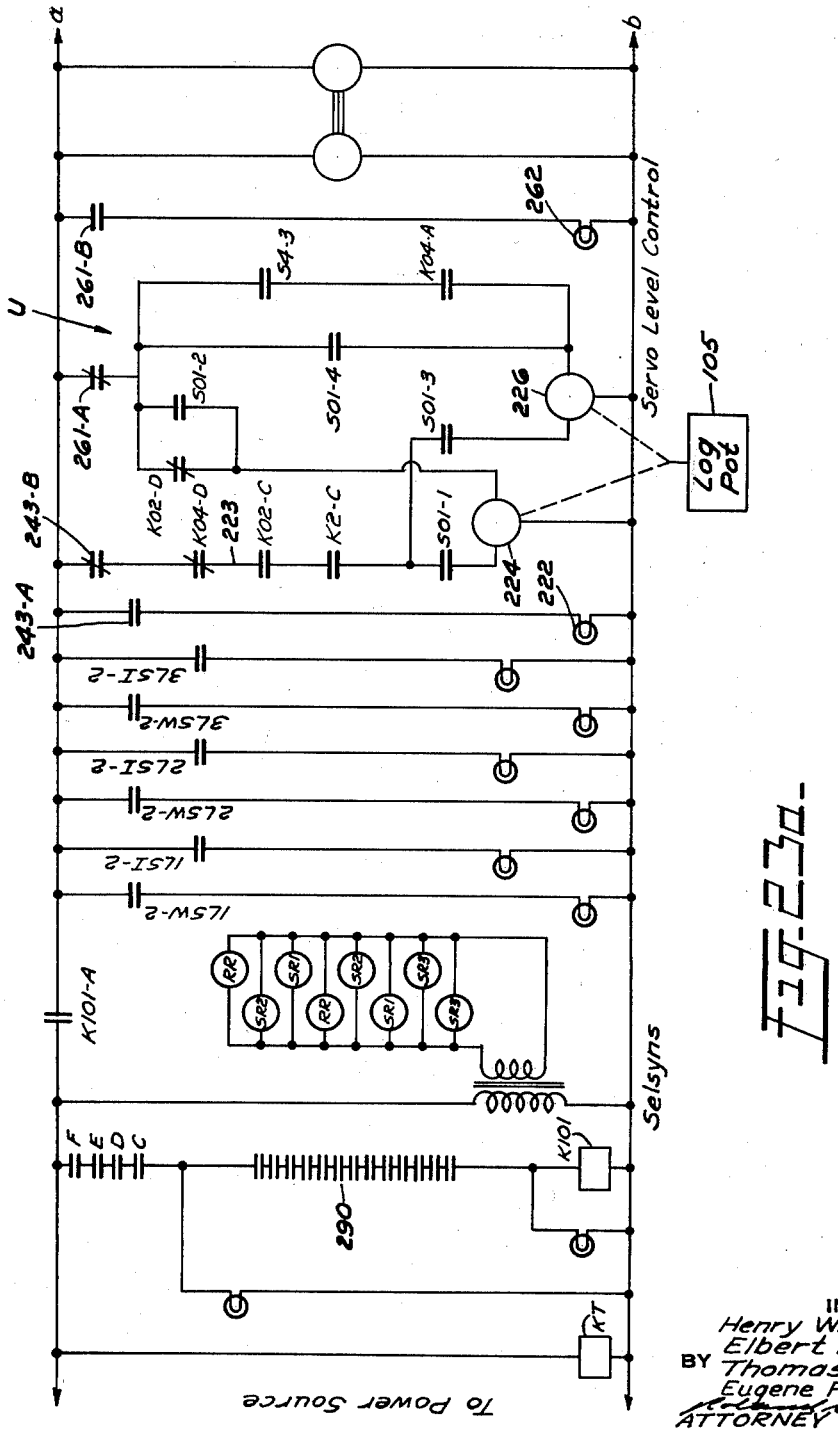
Figure 27:
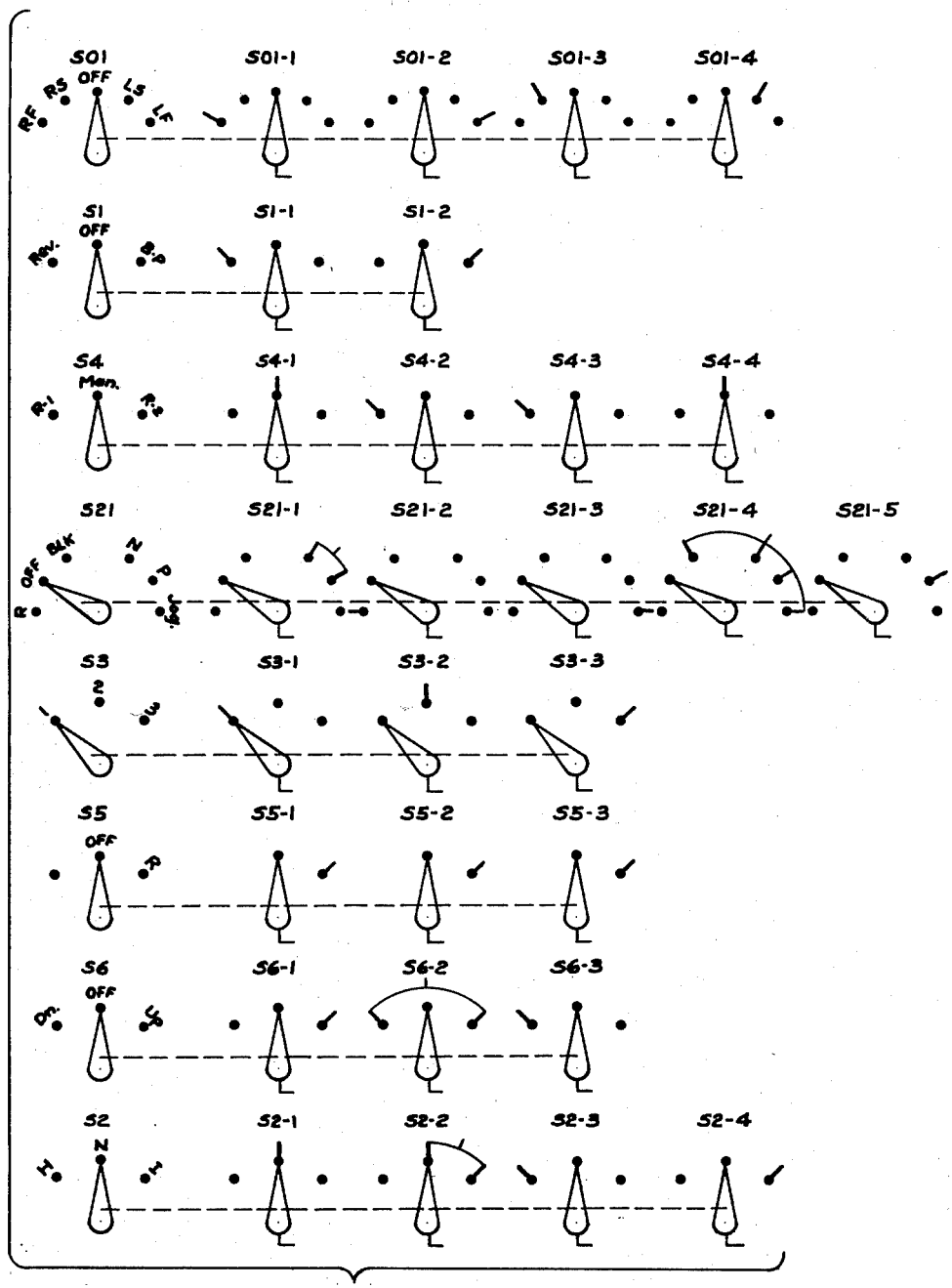

In the drawings, Figure 1 is a fragmental elevation, partly in section, of a high flux neutron reactor. Figure 2 is an elevation of a fuel element for use in the reactor of Figure 1. Figure 3 is a fragmental cross sectional view of the same fuel element taken along the line 3—3 of Figure 2. Figure 4 is a detail of one of the plates incorporated in the fuel element of Figure 2. Figure 5 is a longitudinal sectional elevation of a shim rod used in our improved control system for high flux reactors. Figure 6 is a longitudinal sectional elevation of the regulating rod used in our improved control system for high flux reactors. Figure 7 is a fragmental detail of a fuel element anchored in a grid of the lattice of the pile. Figure 8 is a detail of the top plug of the reactor and the actuating mechanism for the shim rods and regulating rod. Figure 9 is a detail of the drive for one of the shim rods. Figure 10 is a block diagram of the control system for releasing the shim rods to "scram" the pile. Figure 11 is a block diagram of the system for controlling the insertion and removal of the shim rods. Figure 12 is a block diagram of the circuit for controlling the position of the regulating rod in the pile. Figure 13 is a block diagram of the control circuit operated by the fission chamber. Figure 14 is a schematic of the shim rod and control switches. Figure 15 is a schematic of the regulating rod and control switches. Figure 16 is a horizontal view of a section of the reflector and lattice arrangement of the high flux neutron reactor of Fig. 1. Figure 17 is a schematic of the preamplifier used in the fission chamber detecting channel. Figure 18 is a schematic of the log N amplifier used in the period channel. Figure 19 is a schematic of the period amplifier used in the period channel. Figure 20 is a schematic of a sigma amplifier and its preamplifier used in the level channel. Figure 21 is a schematic of a preferred form of magnet amplifier. Figure 22 is a schematic of a preferred form of servo amplifier and preamplifier. Figures 23a, 23b, and 23c are schematics of the servo level control, set back, speed selection, and withdrawal rod circuits. Figure 24 is a schematic of one embodiment of the control circuit for the magnet amplifiers. Figure 25 is a schematic of the power circuits for the shim rod drive motors of the system of Figure 24. Figures 26a and 26b are schematics of the insert rod and shim rod seat circuits. Figure 27 is a schematic of the group of manually operated switches which are under the control of the operator for regulating the pile.

Reactor

Referring to the drawings in detail, Figure 1 shows one form of a heterogeneous type of high flux pile using uranium, enriched in the isotope 235, as a fuel. This embodiment of the invention has been selected for illustrating the application of applicants' improved control system to a high flux pile. In this particular reactor, 1 designates generally a tank which is comprised of a series of sections 2, 3, 4, 5 and 6 positioned in end abutting relation. Section 3 is preferably made of aluminum while the other sections may be fabricated from steel or stainless steel. The various tank sections terminate in flanges such as 5', 6' which are preferably secured together in abutting relation by bolts 7 and serve to compress an appropriate gasket 8, such as aluminum, interposed therebetween, to seal the joints. The tank may be conveniently supported through the upper section 6 and the lower section 2 by I beams 64, 65 or other appropriate means. To provide for necessary expansion and contraction in the tank, a bellows or expansion joint 4 is inserted in an intermediate portion.

Mounted on the upper extremity of the tank 1, to act as a support and closure, is a plug 9 of steel or other suitable construction. Depending from the lower face of this plug are a series of supporting arms 10, 10 which serve to mount a guide or frame structure 11, to guide the regulating rod 25 in its movement towards and away from the beryllium reflector 20, and to guide the shim rods 12 into the spaced upper and lower grids 15, 16 (of like configuration) of the active lattice 13. The regulating rod 25 and the shim rods 12 are supported from a supporting structure above the plug 9. This is accomplished by using rods 24 and 14 of Fig. 8, respectively, which pass upwardly through guide 11 and plug 9, and are suspended as hereinafter described. Rod 14 is engaged by antifriction rollers 60, 61 on the plug 9 and guide 11. The shim rods 12 are joined to their lifting rods 14 by magnetic clutches 17. The regulating rod is joined to supporting rod or shaft 24 through a quick release coupling 62. The lower grid 16, which is preferably of rectangular configuration as indicated in Figure 16, may be removably supported from the walls of the tank 1 by appropriate brackets 30. The upper grid 15 has a peripherical shoulder 68 which comes to rest upon the flange 67 of the guiding brackets 31 carried by the tank 1 and receives the upper reduced ends 32 of the fuel elements 18. The lower reduced ends 33 of these elements are seated in the lower grid 16 to form the active lattice. In this arrangement, as shown in Fig. 7, it will be seen that the upper grid 15 in coming to rest upon the flange 67 serves to move washer 69 downwardly, and compress helical spring 19 against upper shoulder 34 of the fuel element 18, and this serves to retain the fuel element in place, since it is in turn supported by the lower grid element 16 through a similar shoulder adjacent reduced portion 33.

The fuel elements are placed between the upper and lower grid elements 15, 16 in a rectangular lattice arrangement as indicated at 13 in Fig. 16. Surrounding the lattice, and partially enclosing it, is a neutron reflector which may conveniently take the form of a wall 20 of beryllium made up of individual blocks which have been pressed and sintered, and which are appropriately stacked. This reflector is supported by suitable supports, such as the brackets 30 which are affixed to the inner wall of tank section 3. While heavy water or graphite might conceivably have been used as the reflector, beryllium was found to be more effective than those substances. It has good corrosion resistance, and can withstand radiation damage more effectively than graphite. Like heavy water, it supplies additional neutrons by virtue of the $\gamma$-ray neutron ($\gamma$, N) reaction in which neutrons are emitted by beryllium under the $\gamma$-ray irradiation. It also serves to reflect neutrons back towards the center of the pile.

In a more elaborate arrangement, the beryllium wall may be comprised of a series of elongated blocks extending longitudinally of the reflector wall and substantially coextensive with its length. These blocks may be grooved so that, when fitted together, they form passages 400 for the flow of water for cooling and moderating purposes, as shown in Fig. 16. The blocks may be individually removed from the mouth of the tank by simply raising them with an appropriate lifting means. In this way certain blocks may be replaced when desired or appropriate samples may be substituted therefor for irradiation.

Disposed about tank section 3, and serving to enclose it, is a mass of graphite balls 21 which form a further neutron reflector adjacent the fuel assembly. Beyond the graphite reflector 21, and enclosing the tank 1, is a biological shield 22 of concrete which may be several feet thick and may take the form of several layers of concrete blocks stacked in the manner of an enclosing wall, with mortar joining the blocks of the outer layer. If desired, appropriate air space 23 may be provided between the outer wall of the tank 1 and the concrete wall 22 to permit the flow of air to aid in the cooling.

Extending inwardly, through the concrete wall 22, the graphite reflector 21 and beryllium reflector 20 to the core or lattice 13 of the pile, may be a series of sample tubes, one of which is designated 66 in Fig. 1. For purposes of convenience, the showing of the other tubes in this figure have been omitted, but they are designed to facilitate the exposure of various samples to the radiations of the pile.

Water is employed both as a moderator and as a cooling medium, and the level of the pool in the tank is maintained at a sufficient height to submerge the active lattice in several feet of water, thereby providing protection to operating personnel, located above. It may be fed into the upper portion of the tank 1 through inlet pipe 26 and removed from the lower extremity of the tank through outlet pipe 27. It may then be circulated through a purification system (not shown) to de-mineralize it before being returned through inlet pipe 26. This tends to reduce activity in the water which might result from irradiation of impurities.

Fuel element

The fuel element 18, shown in detail in Fig. 2, includes an elongated housing 35 of substantially rectangular cross section into which is disposed a series of thin elongated plates 36, 36. In fabricating the fuel element, the plates are secured in spaced relation in grooves 85 in aluminum side plates 43, 43 at their opposite free edges by brazing 37, or other appropriate means. The housing is then completed and end boxes 32, 33 fitted thereon. The fuel is contained in "sandwiches" shown in Fig. 4, which comprise a thin elongated metal sheet 41 of an alloy of aluminum and enriched uranium. The sheet 41 is coated or clad on both sides with a layer of aluminum 40, 42. The coat of aluminum serves to contain the fission products resulting from the activity in the pile, inhibits corrosion of the fuel elements, and prevents the escape of the fission products into the water where they could produce contamination. In addition, it provides a very convenient way of preserving the fission products for recovery in later chemical treatment. The finished sheet 36 is then deformed to bowed configuration and firmly secured in the housing 35, as shown in Fig. 3. The result is a series of spaced bowed plates between which the water of the reactor may flow for cooling and moderating purposes. With this arrangement, the plates are prevented from contacting each other and creating points where excessive heat may be generated, if they should become distorted as the result of heating or otherwise. The fuel element, when positioned upright in the lattice, permits the water to enter an end box at the top thereof and flow down between the plates and out at the bottom.

Shim rod

Regulation and safety control of the pile is intended to be effected by the shim rods. One form of shim rod is shown in detail in Fig. 5. It is designed to engage a clutch 17 which is essentially a horseshoe or bipolar electromagnet. The clutch housing is grounded when it engages the shim rod and forms one side of a circuit that indicates when the magnetic clutch is supporting the shim-safety rod. At other times it is isolated from ground. It is comprised of an upper armature section 44, and a lower socket portion with an inturned lip to receive and interlock with a head 46 on the end of shank 47. A helical compression spring 49, disposed about shank 47, serves to normally maintain body 50 away from armature 44, and acts like a universal joint to aid in the proper seating of the armature on the electromagnet of the clutch. The lower end of shank 47 is threaded into the upper end of tubular body 50. Positioned below the shank 47, and disposed within the upper portion of body 50, is a neutron absorber of at least 100 barns which preferably takes the form of a cadmium sheet 51, held in place by pins 52, 52, projecting through the wall of the body in screw threaded relation therewith, and into recesses or slots in sheet 51 to interlock the body with the sheet. Disposed within the lower portion of body 50, and positioned below the absorber 51, are a series of fuel plates 36' of the character heretofore described in connection with the fuel element of Figs. 2 and 3. Formed in the body 50, adjacent its upper and lower ends, are inlet and outlet openings 53, 54, respectively, to permit water to pass freely through the assembly from top to bottom for cooling purposes and to act as a moderator. Secured by appropriate means to the lower end of the body 50 is a shock section 55'. In an alternative form of shim rod (not shown), the lower fuel section may be replaced by beryllium which will act as a reflector. Where the characteristics of the pile are desired to be altered, a certain proportion of the shim rods may be of this alternative type.

Regulating rod

Control of the operation of the pile is also effected with a regulating rod. The regulating rod 25 is one embodiment that may be employed. It is substantially smaller than the shim rods. As indicated in Fig. 6, it may have a tubular body 38 of aluminum with an intermediate portion containing a neutron absorbing material, such as cadmium 39, sandwiched in the aluminum tubing. The rod has an annular shoulder 55 which is adapted to rest upon the upper grid 15 when the regulating rod is disconnected from its supporting shaft 24. The upper end of tube 38 is adapted to receive the reduced portion of a plug 56, and carries a tubular extension 57 with coupling detents or balls 58 which seat in openings 63 therein. A sleeve 59 is designed to depress them into engagement with the supporting rod 24 which extends into and is received by extension 57. Anti-friction guide bearings 60 are provided in the plug 9 and guide 11, respectively, for engagement with the supporting rod or shaft 24 during its travel into and out of the reactor. Its purpose is to secure a continuous control of the reactor by a fine adjustment of the pile flux and may be employed to maintain the pile at some desired fixed operating level. It is ordinarily operated in response to a servo-mechanism which is described hereinafter. The regulating rod is not customarily inserted directly into the lattice, but is generally received by the beryllium reflector where it will effect smaller changes in flux. Being an absorber, it is apparent that the lowering of the regulating rod 25 into the pile causes it to take up or absorb neutrons and thus reduce the pile activity. On the other hand, the raising of the regulating rod 25 removes it from the pile and reduces the number of neutrons absorbed, thereby permitting the activity to increase.

Action of control rods

In one embodiment of the invention about 19% excess reactivity is built into the pile, hence the control rods must provide the margin of safety. In such instance, the control rods when in their lower positions, will overcome an excess reactivity of greater than 40%. For this purpose there are preferably two regulating rods, one of which is provided for use on a stand-by basis, and seven shim rods. However, the number may vary to suit the requirements of each installation. The shim rods, particularly in starting up the pile, are customarily moved upwardly from their shock absorbers 70 towards the raised position so that the lower fuel portion of the rod is in the lattice where it can make maximum contribution to the activity of the pile. Nevertheless, if the period of the pile increases too rapidly, the shim rods may be lowered to project the fuel portions below the lattice and bring the cadmium into the lattice, thereby effecting the dual function of removing part of the available activity and introducing absorber into the active lattice to reduce the effectiveness of the activity. This will have the effect of causing the pile level to drop. However, in the event of a very rapid and dangerous rise of the pile level, so as to make it necessary to decrease K quickly, the current flow through the electro-magnets of the clutches 17 is turned off and the shim rods are released and fall with an acceleration somewhat greater than g because the water flow forces on the rods are also downward. This letting go or release of one or more rods is known as a "scram."

Control rod actuating mechanism

Referring now to Figs. 8 and 9, where representative shim rod and regulating rod actuating mechanisms are disclosed, 72 designates a table supported by legs or columns 71, 71 which rest upon or are secured to the top plug 9. Mounted on the upper surface of the table 72 is a servo-controlled D.C. motor 79 having a shaft 82 that carries a pinion 81 which coacts with a rack 80 mounted directly upon lifting rod or shaft 24 that serves to suspend the regulating rod 25 for projecting it into and out of the pile as the motor shaft 82 is rotated in one or the other direction. Suspended from the under surface of the table 72 is a motor 74. For this purpose a three phase squirrel cage induction type motor is preferable since it will not operate above synchronous speed, and this reduces the chance of run away due to some accident. The motor 74 has a shaft 76 which carries a worm gear 83 for coaction with a beveled gear 75 threaded at 78 on to suspension shaft 14 which serves to support a shim rod carried by its lower extremity through a magnetic clutch. Also depending from the lower surface of the table 72 is an angularly spaced bracket 73 which acts as a bearing for supporting and swivelly mounting the gear 75 to permit only rotary movement thereof, since the suspension shaft 14 passes down through bore 84 therein, and is freely movable therethrough. It will be apparent that operation of motor 74 in one direction will cause the worm actuated gear 75 to rotate in one direction, and since it is threaded on shaft 14 it will have the effect of threading the gear further onto the shaft, causing the shim rod to be raised. Then, if two of the three leads of the motor are exchanged, phase interchange will result, and the motor will be caused to rotate in the opposite direction. This will thread the gear 75 off the shaft 14 and lower the shim rod into the pile. For shim rods start, stop and reverse are the only actions necessary. A highly satisfactory means of having fine control of motor speed may be realized by the insertion of a single resistor in the supply lead of each phase.

*Control signals*

Safety and operational control of the pile is effected in response to signals received from various fission and ion chambers preferably housed in aluminum cans (not shown) positioned above and to the rear of the lattice. The control system of the pile performs the major functions of safety and operational control, and both safety and operational control circuits are provided for the purpose. However, they are so interconnected that they function as a single system rather than independently.

*Safety circuits*

The primary safety device is a group of shim rods previously described. Their release to scram the pile is controlled by the level safety and period safety channels. There are other conditions, however, which are potentially dangerous to the point that the reactor will be required to scram. Examples of such conditions are lack of cooling water flow and loss of control power. Inasmuch as these conditions are not associated with short periods, it is not necessary to use fast scrams, and the shim rods are released and dropped by simply cutting off, with a relay KSC, Fig. 24, the 60 cycle input power to the magnet current supplies. In the block diagram of Fig. 10 two typical channels are shown. The upper channel is a level channel and the lower channel is a period channel. In actual practice, three level and two period channels are preferably employed. The reason for this is that at all times the operator should have two level channels and one period channel available. By providing three level channels and two period channels, some margin of safety is provided. The failure of one level channel and one period channel would not, therefore, deprive the operator of adequate safety control over the pile.

In the upper channel a signal proportional to neutron flux is obtained from a boron coated parallel plate ionization chamber 86, preferably of the type disclosed in ORNL Report 1080, issued September 4, 1951, and entitled "The Neutron Sensitive PCP Ionization Chamber," and this is fed into a D.C. type of preamplifier 87 with a cathode follower type ouput which feeds into the sigma amplifier 88, whose output is connected through cathode follower coupling to a sigma bus 89. The other level channels are similar to this one. In the operation of this channel, current comes from chamber 86 proportional to the level of neutron flux. The cathode follower of the preamplifier 87 then measures the voltage developed when flowing through a resistor. The output signal from this preamplifier is applied to a resistance network in the sigma amplifier 88 which may be employed to operate a continuous balance recording potentiometer 90. The sigma amplifier 88, which is one of a series of sigma amplifiers employed, acts to produce a signal for the sigma bus 89 which is nearly constant until the reactor approaches full power. At that time the signal at the sigma bus 89 becomes proportional to the signal applied to it from the sigma amplifier with the largest signal. It is thus seen that an increase of ionization current causes the preamplifier grid to go positive which drives the grid of the sigma amplifier and the sigma bus 89 positive. If this action has occurred in only one of the five sigma amplifiers (two of which are shown), the cathodes in the other four amplifiers are also carried positive, and the tubes of these amplifiers tend to cut off. One of these tubes can take over from the first mentioned amplifier only if its grid is driven more positive than the grid of such amplifier. Thus the sigma bus is always under the control of the channel with the largest signal.

The period channel, of which there are two, is founded on the proposition that a signal proportional to $d/dt$ (ln N) is a useful indicator of excess K of the reactor, particularly at low operating levels. It is convenient to generate such a signal by first obtaining a voltage proportional to ln N, and then differentiating it by passing it through an appropriate circuit. In addition, the ln N signal is convenient in itself by providing a wide range of indication of the flux level and a log N recorder 97 is coupled to amplifier 92 for that purpose. Unfortunately, fission product gamma rays produce current in the ordinary boron coated ionization chamber, and such situation is not favorable after the reactor has been running at some high power for awhile, and then the neutron flux is reduced. The gamma intensity will decrease slowly compared to the neutron flux because of the presence of long life gamma emitters among the fission products. To overcome these effects, a compensated ion chamber 91 is employed. One preferred form of such chamber is disclosed in the prior co-pending application of MacNeille, S.N. 153,249, filed March 31, 1950, United States Patent 2,714,677, issued August 2, 1955. This makes it possible to have favorable readings of neutron flux, in the presence of a large gamma flux. With a compensated chamber, currents proportional to neutron flux over a range of $10^6$ have been found possible. Chamber 91 feeds into ln N amplifier 92 which may contain a diode operating in the logarithmic portion of its characteristic, and provides a D.C. signal which is a logarithmic function of the neutron flux for the ln N recorder 97, and a D.C. signal which is a derivative of the logarithmic function of the neutron flux for the period recorder 98. However, the derivative network of this amplifier is not used to instigate or control the operation of the safety equipment, because the parameters of the circuit are not suited and would require redesign. Instead, the output of the amplifier 92 is fed to a period amplifier 93 which serves as a coupling or matching and amplifying device between the ln N amplifier 92 and the sigma amplifier 88' and permits the preamplifier for the sigma amplifier to be omitted. It also serves to differentiate the signal, and instead of the usual preamplifier, it functions, in addition, to set the D.C. level of the sigma amplifier. For instance, the output of the period amplifier 93 can be made to provide a quiescent voltage of +22 volts at zero signal, and to increase this signal to +37 volts on a positive one second period to provide a scram signal to the sigma amplifier. The input to the period amplifier 93 is a direct current voltage proportional to ln N, taken from the ln N amplifier 92. The signal is differentiated in an RC network, amplified and then fed to a cathode follower to provide the output of the period amplifier 93.

The high-voltage power supply 94 is conventional and is intended to meet the requirements of the compensated ionization chamber for positive and negative high-voltage supplies for its high-voltage electrodes while the voltages supplied are substantially free of ripple with the positive voltage maintained at a predetermined fixed value, and the negative voltage adjustable to provide a variance on the compensation.

The period channel operates on the differential of the ln N of the signal. In operation signals from the compensated ionization chamber 91 are fed to the ln N amplifier 92 which produces a ln N signal. This signal is then fed to the period amplifier 93 and differentiated therein, giving a $d/dt$ (ln N) signal which is used to operate the sigma amplifier 88'.

The magnet amplifier 95 contains a D.C. power amplifier for supplying current to an electromagnet of the clutch 17. High plate resistance and high plate voltage ratings enables it to meet this difficult arc provoking job. The bus 89 is connected to the grid of a cathode follower which is monitored.

For convenience, only a single power amplifier and magnet are shown, and while this arrangement is adapted to support a single shim rod, it will be understood that similar arrangements will be provided for each shim rod used in the pile. For increased reliability of operation, or for protection of continued pile operation, it may be desirable, in each instance, to employ an additional magnet amplifier 95' in parallel with the first one to supply the magnet current. Then in the event of failure of one magnet amplifier, the other can carry the magnet without exceeding its capacity. The magnet amplifier 95 contains a D.C. power amplifier for supplying current to the electromagnet 96, in combination with a voltage amplifier to regulate this current. Connected in parallel with the electro-magnet 96 in the common plate lead, they provide a safe and convenient arrangement for quickly cutting off the current in this highly inductive circuit. In order to make it amenable to monitoring the sigma bus 89 is normally maintained at about 35 volts. Any leakage serious enough to reduce this voltage should "scram" the rods. Hence, the voltage amplifiers of the magnet amplifier 95 must function to de-energize the magnet 96 to drop the rod when the bus voltage departs in either direction from its quiescent potential.

In operation, the current through magnet 96 can be set to release the shim rod when a certain predetermined flux is reached. Under the control of the sigma bus 89, as the power level of the reactor is increased, the magnet current remains nearly constant until the reactor approaches full power, and then the current through the magnet 96 is decreased as the flux increases until the point is reached where the magnet is no longer able to support the rod.

*Shim rod regulating function*

In addition to the drastic control action effected by the "scram" of the shim rods, there is the dual control which is exercised (*a*) manually in response to indications from various recorders or (*b*) automatically in response to the completion of certain circuits by switches, which respond to certain positions of the channel recorders or which are activated by the shim rods and regulating rod upon reaching certain predetermined positions. Thus the shim rods not only perform a safety function, but also serve to regulate the pile, for each A.C. motor 74 when operated in one direction inserts the rod into the pile and when operated in the opposite direction removes it therefrom.

The block diagram of Fig. 11 illustrates the general arrangement for carrying out this control function, wherein manual means 101 is provided to operate the reversing contactors 102 for interchanging the leads from the power source 103 to the three phase motor 74 to effect reversal of its rotation for raising or lowering the shim rod 12. While only one motor and one shim rod are shown, for purposes of simplification, it will be understood that the reversing contactors 102 may be similarly employed to control such other motors and shim rods as may be required for the particular reactor used. The recorder 115 of the fission chamber channel, which is the most sensitive control circuit, is provided with two mercury switches on its drive mechanism that close a circuit to actuate the reversing contactors 102 through contacts 255 and 240, respectively, of the mercury switches of said recorder and immobilize shim rod withdrawal when the recorder shows less than two counts per second, or more than 10,000 counts per second (full scale). The next detector sensing neutron flux is the pile period recorder 98 in the period channel, heretofore described. The period recorder 98 has four mercury switches (two of which are thirty second switches) on its drive mechanism which tie into the reactor control system. These switches become activated on periods of thirty, seven and five seconds. One thirty second period switch has contact 239 which immobilizes the shim rod withdrawal on start-up when the period becomes less than thirty seconds. On the other hand, the contact 239' of the other thirty second switch will be closed when the period is less than thirty seconds. The seven second period switch through contact 238 immobilizes the withdrawal of shim rods at start-up when the period is less than seven seconds. The five second period switch through contact 244 effects an automatic insertion of all shim rods called a "reverse" when the period is below five seconds. The log N recorder 97 has four mercury switches on its drive mechanism. The first becomes activated at $10^{-5}$ $N_F$ (where $N_F$ is full operating flux) and through contact 251 allows withdrawal at re-start of all shim rods at high speed. The second switch becomes activated at $10^{-3}$ $N_F$ and through contact 285 permits the operator to get out of "start" on the start-up and out of "Run" in shutdown. The third switch with contact 242 is activated at $N_L$ or $10^{-2}$ $N_F$. This permits the system to get into "Run" if certain other conditions are suitable. The fourth switch becomes activated at 3 $N_L$ and through contact 253 gives automatic insertion of all the rods if the system is not in "Run." When the pile rises to a predetermined level, the level recorder 90 fed by the level channel, will act to actuate the contactors 102 and cause the motor 74 to drive the rod 12 into the pile. This is accomplished by two mercury switches attached to the drive mechanism of the recorder. The first switch becomes activated at 1.1 $N_F$ and this gives through contacts 252 an automatic lowering of the servo demand level called "set back." The second switch becomes activated at 1.2 $N_F$ which closes contact 227 and results in an automatic insertion of all shim rods. This action will take place even though the motor 74 is under the control of the manual means 101 at the time and is operating to withdraw the shim rod 12 from the pile. In that event, the manual control means will temporarily lose control over the motor which will simply be reversed. The control exercised by the pile level recorder 90, log N recorder 97, the pile period recorder 98, and count rate meter recorder 115 takes precedence over the manual control 101 in being able to stop or reverse the motor 74 when it is moving rod 12 out of the pile under manual control 101. In this way, the regulating or control system may act sufficiently soon to correct a potentially dangerous situation without having to resort to the extreme action of scramming the pile.

*Fission chamber channel*

Of the control circuits, the fission chamber 121 with its allied preamplifier 116 and amplifier 117 of Fig. 13 is the most sensitive in the reactor instrumentation and the output is shown on a recorder 119 which may be of the 10 millivolt type. The fission chamber may take any suitable form such as those disclosed in chapter 9 of "Ionization Chambers and Counters" by Rossi and Staub, published in 1949 by McGraw-Hill, and consists essentially of a cylindrically shaped device about 1" in diameter and 6" to 7" long. Internally it contains a quantity of uranium-235. Fission of pile neutrons results in fission fragments producing ionization of constantly purged argon gas. The resulting charges are collected and fed to the preamplifier 116 which preferably has four tubes with an average gain of about 30. It then feeds through a cathode follower coupling into amplifier 117, as will be described more in detail hereinafter. In the latter amplifier the signals are amplified and pulse discrimination and shaping takes place. This amplifier is preferably of the A-1 type described in an article by Bell et al. contained in the October 1947 issue of "Review of Scientific Instruments," vol. 18, page 703, and may have a gain of up to 10,000. Amplifier 117 feeds a scaler 120 preferably of the 1024 type of Higginbotham described in vol. 18 of "Review of Scientific Instruments, page 706, or one of the Elmore and Sands Scalers disclosed in their book on "Electronics," published by McGraw-Hill in 1949, beginning on page 216, and a log count rate meter 118. The log count rate meter is an integrating device which gives a D.C. output that is a log function of the counting rate. This is preferably of the type discussed in ORNL Publication No. 413, "Logarithms in Instrumentation," by W. C. James, and schematically shown in the circuit diagram of Fig. 4, of that publication, and includes a capacitor and a logarithmic diode. The output from meter 118 is then fed to the recorder 119 which not only provides visual indication but also includes necessary circuit control means.

*Manually operated switches*

Fig. 27 shows a group of switches which are ganged together and represents the various manual controls available to the operator that make up the console. While these manual switches may take any suitable form, the SB type switch disclosed in publication, GEA—No. 4746B, "Control and Transfer Switches," published by the General Electric Company, Schenectady, New York, has been found suitable for this purpose.

It will be noted that applicants have shown these various switches in schematic form, and have employed the contact and wiper type of multiple contact switch for purposes of illustration. This type of switch is suitable for the purpose, but may not necessarily be preferable. However, it lends itself to a clear schematic showing of switch contacts and circuit relationships for various switch positions which is not possible with other suitable types of switches.

The first switch shown is the servo level control switch, S01, which has five possible positions, four of which are contact positions. They are in order: (a) raise fast, (b) raise slow, (c) off, (d) lower slow, and (f) lower fast. It will thus be seen that these various positions of the switch determine which of the two servo motors will be operated at any particular time, and whether the operation shall be to raise the regulating rod or to lower it. In this connection, it will be understood that the wipers are spring returned, that is, the contact arms will always be returned to the off position by spring action when the switch is released from the grasp of the operator. An examination of Fig. 27 will indicate that when the position pointer on the extreme left is at the RF (raise fast) position, the first contact arm S01–1 will be in the number one contact position which will complete a circuit through the wiper and contact to the desired circuit elements. In this same position, contact S01–2, S01–3, and S01–4 will complete no circuits. When the pointer is moved to the RS (raise slow) position, the four contact arms which are ganged with it will be moved to the second contact position. In this position, it will be seen that a circuit will be completed to the appropriate elements through the S01–3 contact. Then, when the pointer is released by the operator, it will return to the off position which corresponds to the third contact position of the four switch wipers. No circuits are closed in this third contact position. Now, if the operator moves the pointer to the LS (lower slow) position, the ganged wipers will be moved to their fourth contact position, which will complete a circuit through S01–4 contact. Then, if the operator moves the pointer to the LF (lower fast) position, the wipers of the other switches will be on their fifth contact which will close a circuit through the S01–2 contact.

The second switch is the S1 reverse by-pass switch which has a pointer and two wipers. It is a spring return switch and normally remains in the center or off position. When moved to the REV (reverse) position, the circuit through the first contact arm is closed as seen at S1–1. When released by the operator, the pointer will then return to off and must be grasped again by the operator before being moved to the BP (by-pass) position. In this position, the second wiper completes a circuit as indicated by the S1–2 contact.

The next switch is the S4 servo-manual control switch. It has a pointer arm and four wipers. It is not a spring return switch, but will remain in the position where it is moved by the operator. In the first contact position, which is the rod 1 position, the S4–2 contact is closed along with the S4–3 contact. In the center or MAN (manual) position, the S4–1 contact and the S4–4 contact are closed. For purposes of convenience, the circuit through the various contacts S4–1, S4–2, S4–3, and S4–4 are not shown in the R2 (rod 2) position.

The next manually operated switch is the S21 shim rod control switch. There are similar shim rod control switches, S22 and S23, corresponding to each of the shim rods, but these are not shown since they are identical to the S21 switch. This switch has six different positions. They are in order: (a) raise, (b) off, (c) block, (d) NORM (normal), (e) PREF (preferred), and (f) jog. This is a modified spring return type of switch since it will only return the pointer to the previous position when it reaches the last or jog position. At that point, it will be understood that the switch will be returned to the PREF position when released from the grasp of the operator. When the pointer is in the first position, only the S21–2 contact is closed. When in the off position no contacts are closed. When in the block position, the S21–4 contact is closed. When in the NORM position, contacts S21–1 and S21–4 are closed. When in the PREF position, contacts S21–1 and S21–4 and S21–5 are closed. When in the last or jog position, contacts S21–3 and S21–4 are closed.

The next switch is the S3 rod selector switch. It is not of the spring return type since the switch will remain in any position where it is released from the grasp of the operator, until such time as the operator moves it. This switch contains three contacts and has three positions. In the number one position, the S3–1 contact is closed, and when in the number three position, the S3–3 contact is closed.

The next switch is the S5 raise clutch switch. This switch has a pointer and three wipers or contacts. There are only two positions. These positions are the "off" and "raise" positions. When the switch is in the "off" position none of the contacts are closed. When in the "raise" position all of the contacts are closed. This switch is not of the spring return type.

The next switch is the S6 speed switch. It has three contacts or wipers and three different positions. It is of the spring return type. The three positions are "up," "off," and "down," with the switch always being returned to the "off" position when released from the grasp of the operator. In the "up" position, contacts S6–1 and S6–2 are closed. In the "down" position the contacts S6–2 and S6–3 are closed. In the "off" position none of the contacts is closed.

The final switch is the S2 speed switch which has three positions and four contacts. It is a modified spring return type of switch. The three positions are "INT" (intermediate), "NEUT" (neutral), and "high." When placed in the "high" position and then released from the grasp of the operator, the switch will return to the "NEUT" position. When in either of the other two positions, the switch will remain there until moved by the operator. In the "INT" position, contacts S2–2 and S2–4 are closed. In the "NEUT" position, contacts S2–1 and S2–2 are closed. When in the "high" position, contact S2–3 is closed.

In practice, these various switches are mounted on a panel board or console in front of the operator where he may have easy access to them for adjusting their positions. This he does by reference to the various recorders and meters, described herein, which provide information from which he can determine the state of operation at any particular time, and can take the necessary manual switch action.

Shim rod switches

Referring now to Figure 14 where the relation of the shim rod to its switches is disclosed, it will be seen that the magnetic clutch 17 serves to join the lifting rod 14 and shim rod 12, and to maintain them in assembled relation, and micro-switches for control purposes and for indicating the positions of the rods with respect to certain fixed positions are indicated at 1LSW–1, 1LSW–2, 1LSI–1, and 1LSI–2. Signals instigated by them go to the control system and to instruments providing information for the operator. The shim safety rod operates two sets of limit switches. The upper set operates when the rod is withdrawn a predetermined distance from the fully inserted position. This distance is determined (a) by the maximum distance which is mechanically possible, and (b) the need for keeping some sensitivity of safety rod action. The lower set of limit switches are back up switches whose action would usually be forestalled by action of the other shim rod switches, the magnetic clutch switch 1', and the 77A contact of the seat switch 77. If the rod 12 is engaged in its holder so the clutch 1' is closed, the 77A contact of the seat switch 77 would operate to stop the motor if the rod is fully inserted. If the rod 12 has been released by "scram" and is resting on the bottom, then the clutch switches would operate to stop the motor as the holder comes into place. Thus the lower limit switches 1LSI–1 and 1LSI–2 would act only if the rod were not in the reactor, or if the clutch or seat switches failed.

Regulating rod switches

In Fig. 15, it will be seen that the regulating rod 25 has a cam portion 25' with an upper slanting face which is adapted to coact with the levers or arms of various switches positioned along the path of travel of the rod. It will be apparent that when the rod and its cam portion 25' are in raised position, the cam will have depressed the levers on the various switches, and then as the rod 25 moves downwardly into the pile, the cam portion 25' thereof is progressively lowered disengaging it from the levers on the switches which are projected outwardly toward the rod. Thus, at this stage, the circuit through the upper stop switches LS1 and LS2–1 is completed to maintain the operation of the motor. The withdrawal switches LS2–2 and LS3–A are operated. The insert switch LS3–B is operated. The preferred insert switch LS4–A, the reverse switch LS4–B, and the stop switch LS5 are also operated. The circuits which they control or complete will be particularly referred to hereinafter.

Servo for regulating rod

For maintaining the pile at a predetermined level, the regulating rod 25 is employed. The automatic control thereof is effected in response to the action of the servo controlled D.C. motor 112 which drives the regulating rod. At start-up, with the servo manual control switch S–4 in the rod one position, the shim rods cannot be withdrawn unless the regulating rod 25 is fully withdrawn. In practice, the reactor approaches the desired operating level under manual control, and then the servo comes into range and levels the pile at $N_L$. The servo mechanism is a velocity servo giving a motor shaft speed proportional to input voltage $V_1$ which is the difference between a positive voltage measuring ionization current and a negative reference voltage. The servo functions so that a positive increment in $V_1$ causes the regulating rod 25 to be inserted into the pile. Thus, for any given reference voltage, an increase in neutron flux causes an increase in ionization current, and, hence, an insertion of the regulating rod, or conversely, a decrease in the neutron flux, results in rod withdrawal. Now referring to Fig. 12, the particular function of the coarse control 105 is to provide reactor control over the considerable range between $N_F$ (full operating flux) and $N_L$ (about 1% of $N_F$), and it is in turn partially controlled through the limit switches at either extremity of the log pot. They serve to control the contacts 261A, 261B, 243A, and 243B. The servo system derives its signal from an ion chamber 104, which may be of the 3" PCP type heretofore referred to in lines 67–69, column 9. The level at which the servo controls is determined by a log pot or coarse adjustment 105, and by a vernier adjustment 106 which includes a potentiometer 109. The vernier adjustment 106 varies the voltage of the return 107 of the current of the preamplifier 108. The coarse adjustment 105 involves a logarithmic potentiometer which acts as the grid resistor and may be altered to change the resistance in the grid circuit of the amplifier 108. This potentiometer is made logarithmic since (a) it could not satisfactorily be made linear because the steps would be over 1%, and this would raise the power too much, it being desired to have the power go up in equal amounts, and (b) it will make the regulating rod assume a relatively fixed position while the pile is going up exponentially by changing in logarithmic fashion the magnitude of the signal fed to the input of the preamplifier 108. The resistance element of the potentiometer is not continuous, but is made up of a relatively large number of steps, and in one embodiment covers a range up to 50 megohms in 250 steps. The exponential effect is achieved by making each step proportional to the total resistance at that step. This means a first step of about 10,000 ohms and a final step of about 1 megohm. The output from the servo preamplifier 108 is fed through cathode follower coupling to servo D.C. amplifier 110. This output is made zero volts with respect to current when the pile level agrees with the servo level, and is positive when the pile level goes above the demand level, but is negative when the pile level falls below the demand level. The servo amplifier 110 feeds the control fields of amplidyne 111. In one embodiment a 1500 watt amplidyne was employed. The drive motor of the amplidyne was a three phase 440 volt 3.6 ampere motor. The drive motor 112 for the regulating rod 24 was a 1 H.P., D.C. motor with permanent magnetic field. The rod motor 112 is driven by the amplidyne 111 with armature voltage proportional to the difference in current flowing in the amplidyne fields. It is, therefore, the function of the servo amplifier, 110, to establish the current difference as proportional to $V_1$. The regulating rod motor 112 has a tachometer 113 coupled or otherwise joined to its shaft and is driven by it to supply a voltage proportional to motor velocity to the input of the servo amplifier 110 through the coupling resistor 114. This negative feed back loop serves to stabilize the controlling action of the servo amplifier.

Log N amplifier

A suitable form of log N amplifier 92 for the period channel of Fig. 10 is shown in Fig. 18 wherein 141 designates a logarithmic diode so chosen that it will operate in the logarithmic portion of its characteristic over the range of signals to be encountered. Signals are fed to the anode of diode 141 from an ionization chamber, and across the diode is bridged the input circuit of a D.C. amplifier 143. Bridged across the input circuit of the amplifier 143 is a condenser 144 which is employed to smooth out statistical variations. The output of the first D.C. amplifier 143 is directly coupled to the input of a second D.C. amplifier 145. The output of this second D.C. amplifier feeds a cathode follower in the form of a duo triode 147. Degenerative feed back between the cathodes of the cathode follower 147 and the first stage 143 of the D.C. amplifier is provided through lead 153. This tends to keep the gain constant and improve the linearity. The output of this cathode follower is adapted to be fed to a period amplifier and the log N recorder 97 through lead 148. Thus, log N can be read on meter 154 or recorder 97. It also feeds through lead 148 into a differentiating circuit including condenser bank 149 and resistors 150, 151 to period recorder 88. Pile period may be read from the meter 155 or recorder 88. Biased diodes 152 are connected across the derivative circuit to protect the meter against large transients such as are produced when turning the equipment on or off.

Signal from the ionization chamber produces a current "i" proportional to neutron flux. This current flows through the diode 141 which has the property of producing a voltage across such diode which is proportional to the log N of the current flowing through the diode. This signal is fed to and amplified by D.C. amplifiers 143, 144 and serves to operate log N recorder 97. The output signal from amplifiers 143, 144 is differentiated in RC network 149, 150, 151 and operates period recorder 88 connected in series therewith. Resistance networks 156 and 157 are used to calibrate the circuit and are under the control of gang switch 158 which serves to selectively connect them to the diode 141.

Period amplifier

A suitable form of period amplifier 93 for the period channel of Fig. 10 is shown in Fig. 19 wherein 148 represents the signal lead from the output of the log N amplifier 92. This lead feeds a differentiating network comprising a condenser 159 and a resistor 160. The output of the differentiating network is directly coupled to the input of a two stage amplifier represented by duo triode 161. The first half of this tube acts as a cathode follower, cathode coupled to the second half of the tube, which acts as a voltage amplifier. The grid of the second half of the tube is returned to a suitable bias voltage adjustable with voltage divider 163 to set the D.C. level of the system. The plate of the voltage amplifier is connected to a voltage divider 165 whose output drives cathode follower 162, and whose cathode in turn provides the output signal for lead 164.

As indicated, a pulse with slanting edges is fed from log N amplifier through lead 148. Upon reaching the differentiating network 159, 160, the slanting forward edge produces a rectangular negative pulse $T_3$, since tube 161 while normally conducting is capable of handling both positive and negative input signals. This pulse will be passed on through the cathode follower via the cathode coupling of tube 161 to the voltage amplifier of the second section of the tube 161 to potentiometer 165, and to the grid of the cathode follower 162 and then to the output lead 164 where it may be applied to the sigma amplifier.

Sigma amplifier

A suitable form of preamplifier 87 and sigma amplifier 88 for use in the level channel of Fig. 10 are shown in Fig. 20 wherein 166 designates a cathode follower which normally constitutes a preamplifier 87, sometimes called the safety preamplifier. It measures the voltage drop across the resistor 167. The output of this cathode follower feeds into the input of the sigma amplifier 88. Within the sigma amplifier and fed by the cathode follower is a bridge measuring circuit which includes resistors 168, 169, 170, 171, 172, 173, 174, and 175 which may be employed to operate a continuous-balanced recording potentiometer 176. The signal is also applied to the grid of a second cathode follower which is the first half of double triode 177 whose cathode is connected to the sigma bus through lead 178. The winding of a relay 204 is in series with the plate circuit of cathode follower 177. If this tube is so arranged that it always draws current, then relay 204 will serve to monitor its readiness to react to a signal, for on failure of the tube such relay becomes de-energized breaking the circuit around signal light 179.

The signals encountered by this amplifier vary from zero chamber current to a maximum current set by the maximum reactor operating level plus a suitable safety margin. If the use of the system is restricted to the use of a linear amplifier, it is difficult to insure that the cathode follower or scram tube (the first half of double triode 177) will always draw enough plate current to hold in relay 204. In order to meet this situation, a feed back loop from cathode to grid, incorporating a double diode 180, is employed. The two portions of double diode 180 are connected in series as a precautionary measure against the shorting tendencies of diodes. Through the diode and the circuit connecting the grid to the cathode, the tube is always maintained in the operative state, and the resulting conduction across the tube keeps the relay energized. Then when some defect arises such as the failure of the tube, the relay 204 is released which opens the circuit around the signal light 179 and permits it to operate. By a proper selection of operating voltages, a diode clamp 180 may be made to hold over a range of chamber currents from zero to approximately one-half of the desired scram chamber current. Signals above this level increase the voltage at the grid of tube 177, and as this voltage increases, the diode 180 becomes non-conducting and is no longer effective. In this way the scram tube acts in a manner similar to a relay, while maintaining the ability to have its condition monitored.

The output of the sigma amplifier 88 is the voltage at the cathode of the scram tube. The cathodes of all of the sigma amplifiers are connected in parallel through the sigma bus 89. If something goes wrong within any one channel, it is desired to send out a trouble signal, and to scram the reactor only when the situation reaches the proportions of a dangerous condition. However, if all the sigma amplifiers fail for some reason, the reactor should scram immediately for lack of any fast scram circuits. To accomplish this, the D.C. level of the cathodes of the scram tubes are normally operated at a magnitude above ground of from about 34 to 37 volts, by selection of the D.C. offset of the preamplifier 87. As explained more in detail hereinafter, the magnet amplifiers 95 are so arranged that an appreciable excursion of the sigma bus 89 in either direction from this normal voltage will cause a scram. The sigma amplifiers are so adjusted that any one of them will reliably hold up the sigma bus, all of the other sigma amplifiers when dead, and the various magnet amplifiers with little loss in gain. Thus, any one sigma amplifier can scram even if all of the others are inoperative and it follows that any one can scram with the others receiving normal (safe) signals.

One of the principal reasons for employing this safety circuit was to meet the requirement for close monitoring in order to detect any developing source of trouble or any defect within the safety system. With this system an almost infallible arrangement of monitoring circuits may be utilized, and the occurrence of trouble will result in the giving of an alarm or warning signal, indicating to the pile operator which circuit is out of order and providing the desired information to the technician of the particular malfunction involved to enable speedy repair. Some of these monitoring circuits are indicated in Fig. 20. Relay 181 coupled to the cathode circuit of the second half of tube 177 monitors the D.C. level of the servo amplifier. In one embodiment the relay contacts indicate normal operation when the D.C. level at the input of the D.C. amplifier is above +19 volts with normal level being about +22 volts with zero chamber current, and +32 volts with maximum safe chamber current, and about +37 volts for scram. This second half of tube 177 does not have the feed back which is present in the scram tube, that is, the other half of tube 177. Therefore, it is linear and convenient for monitoring the D.C. level. Release of this relay will open the circuit around signal light 182 and permit it to function.

Relay 183 is in series with the preamplifier grid offset network 184, 185. Since the voltage supply for this network is furnished by a separate lead 186 directly from the preamplifier tube plate, low B+ voltage at this point or any point back to the supply will release relay 183 and remove the by-pass circuit from around signal lamp 187 permitting that light to function.

Relay 188 may be made to serve two functions. One end of the relay winding is connected by lead 189 to the high voltage electrode of the ion chamber of Fig. 10. This lead serves to convey a signal to monitor relay 188. Low voltage or misconnection will signal this relay. The second function of this relay is the monitoring of the position of the signal lead. The ground end of the relay, instead of being grounded directly, is grounded at the ion chamber 86 through lead 190. Thus, the relay will be de-energized if the signal lead is not connected to complete the grid circuit in its shield. De-energization of relay 188 removes the by-pass circuit from around signal light 191 and permits it to become energized.

The matter of detecting whether a scram has taken place as a result of action of tube 177 is accomplished by connecting lead 256 from the upper side of the cathode resistor 257 of the scram tube 177 into the control grid of a thyratron 119 which is biased through cathode resistor network 258 to cutoff. In this situation, relay 259 has its armature on back contact position, whereby completing the circuit to energizing signal lamp 260 from appropriate A.C. source. However, when the voltage drop across resistor 257 rises in response to a scram signal to the control grid of the first section of tube 177, the threshold voltage of the thyratron 119 is exceeded and the tube fires. With this tube conducting the winding of relay 259, in the plate circuit of the thyratron 119, is energized causing the armature thereof to be pulled up to the front contact position. This breaks the circuit through neon signal lead 260, and extinguishes it. At about the same time, it also completes a circuit from the power source through the neon signal light 270. This will give a signal to the operator indicating that a scram has occurred in this circuit.

While the foregoing description relates primarily to the preamplifier and sigma amplifier in the level channel, it will be understood that the sigma amplifier 88' of the period channel of Fig. 10 is of similar arrangement. In that channel the preamplifier has been omitted. This will leave the monitoring relays 183 and 188 without signals. However, these two relays may be conveniently used to monitor two vulnerable points in the period channel. For instance, relay 183 may be used to institute an alarm if the calibrate switch 158 on the log N amplifier of Fig. 18 is not in position for operation. Of course, relay 181 would monitor the operation of the period amplifier 93, since trouble in the period amplifier would change the D.C. level in the sigma amplifier.

Magnet amplifier

A suitable form of magnet amplifier 95 for the safety system of Fig. 10 is shown in Fig. 21. In order to make it suitable for monitoring, the sigma bus 89 is normally operated at a level of +35 volts. Any leakage serious enough to reduce this voltage should drop the shim rods, since such condition will preclude the rising of the bus voltage to scram.

The sigma bus 89 is connected to the control grid of a cathode follower which is the first half of duo triode 192 in whose cathode circuits is connected a VR tube 193 and a resistance bank 194, returned to a negative high voltage supply 194'. The function of the voltage-regulating tube 193 is to change the D.C. level of the signal without the sacrifice in gain which this usually entails in a D.C. amplifier. The resistors 195', 196' simply keep the cathodes of tube 192 at a reasonable potential. Resistor 197 is returned to the B+ supply to keep VR tube 193 conducting under all conditions. The signal from the cathode side of tube 193 is applied to the cathode of the second half of tube 192 which serves as a voltage amplifier. The cathode side of tube 192 is also coupled through lead 195 to the first half of double triode 196 which also acts as a voltage amplifier. The plates of these latter discharge devices are connected together by a common lead 197 which serves to couple them into the control grids of power amplifier 199, 200. These plates draw current from the positive high voltage supply through the common plate resistance 198. It will also be apparent that the grids of the output tubes 199, 200 are connected to a voltage divider 202 hung between the plate end of resistor 198 and negative supply. Increasing the current of either of the discharge devices whose plate is connected to resistor 198 will increase the drop therethrough and decrease the voltage on the grids of the output power tubes 199, 200. This will have the effect of reducing their output current and in turn the magnet current. Under normal conditions, the second half of tube 192 is cut off and the first half is drawing little current. Increasing the voltage of bus 89 will increase the current in the first half of tube 192 and will, in turn, increase the conduction in the amplifier half of tube 196. This will result in lower control grid potentials for the power grids 199, 200 and less magnet current, thereby causing the pile to scram. Decreasing the voltage of bus 89 will cause the second or amplifier half of tube 192 to conduct and scram the pile in the same manner as heretofore described. Resistor 205 is used to set the bias on the amplifier of tube 192 so that at the bus voltage used the amplifier will just be cut off.

The negative end of the magnet high voltage supply 206 is not returned directly to ground. The output current flows through the resistance network 201 which provides a small negative potential at one end proportional to the output current. This voltage is applied to the control grid of the cathode follower or second half of tube 196 which is cathode coupled to the first half of this tube. A feed back loop is thus provided around the amplifier section of tube 196. This provides partial compensation for drifts in tubes and components. Adjustment of the D.C. feed back ratio with resistor 203 provides a convenient means for setting the quiescent magnet current.

From the foregoing it is apparent that the magnet amplifier contains a pair of power amplifiers connected in parallel for supplying D.C. current to the electro-magnet with voltage amplifiers to regulate that current. Connected in parallel, with the magnet in the common lead, they provide a safe and convenient means of quickly cutting off the current in the highly inductive circuit. A high plate resistance and high plate voltage rating provide the conditions necessary for this function.

Preamplifier for fission chamber channel

The circuit of one suitable form of the A-1-A preamplifier 116 of Fig. 13 is schematically shown in Fig. 17, wherein 122 designates the first stage of a resistance coupled amplifier. The control grid of tube 122 is grounded throughout a conventional grid resistor 123 and is separated from high voltage supply lead 124 for the fission chamber by a coupling condenser 125. The usual load or quenching resistors 126, 127 are likewise included in the high voltage circuit. Tube 122 is cathode biased through resistor 128 which also acts as a common grounding resistor for other circuits described hereinafter. The output of tube 122 is coupled to a second stage of amplification 129 with the conventional resistance-capacitance coupling 130, 131, and the output of this stage is, in turn, coupled to a cathode follower 132 through the conventional resistance-capacitance coupling 133, 134. The cathode follower 132 has cathode resistor 135 and common input circuit resistor 136. The output of cathode follower 132 is fed into a second cathode follower 137. It is also coupled to a feed back loop through tube circuit 138 and lead 139 to the cathode circuit of the first amplifier 122. The second cathode follower 137 has its output coupled through lead 140 to the A-1 amplifier 117 of the fission chamber channel of Fig. 13.

Servo amplifier and servo preamplifier

A suitable form of preamplifier 108 and servo amplifier 110 for use in the servo control system of Fig. 12 is shown in Fig. 22 wherein 206 designates the cathode follower of the preamplifier, the control grid circuit of which is adapted to be connected to an ion chamber and to the source of grid bias which is adjusted by the coarse or log pot adjustment 105 and by the vernier 106. A feature of this cathode follower is that it is not returned to ground but is returned to a negative potential such a —90 volts. In one arrangement, where the servo demand level is equal to the pile level, the potential on the control grid of the first section of the tube 206 may be —3 volts with the cathode potential at zero with respect to ground. Then when the pile level goes above the demand level, the grid of the cathode follower of tube 206 may be only —2 volts so that the cathode goes positive to +1 volt, or the pile level may go below the demand level so that the grid of the cathode follower may go to —4 volts and the cathode may go negative to —1 volt. Of course, with different circuit elements and different characteristics, these voltage relationships will vary.

The cathode of the first section of tube 206 feeds through lead 207 to the control grid of duo-triode 208 which functions as a phase inverter. In this way it serves to feed two circuits which are connected in push-pull. In this arrangement, it will be seen that the cathodes of tube 208 are tied together and connected to a common cathode resistor, so that the signal at the plate of the first section of tube 208 is 180° out of phase with the input signal at the control grid. On the other hand, with the cathode coupling between the two sections of tube 208, the signal at the plate of the second section is in phase with the signal on the control grid of the first section. The plate of the first section of tube 208 is coupled through resistor 210 and lead 209 to the control grid of the second section of tube 211. The first section of tube 211 is coupled in like manner to the second section of tube 208. In a similar manner the first section of duo triode 212 is coupled to the second section of tube 211, and the second section of tube 212 is coupled to the first section of tube 211. The output of the first section of tube 212 serves to feed the input of power tubes 213, 214 which have their outputs connected in parallel to lead 218, and the output of the second section of tube 212 is coupled to the inputs of power tubes 215, 216 which have their outputs connected in parallel to lead 217. Leads 217 and 218 are connected to two separate fields 219A and 219B, respectively, of coil 219 of amplidyne 111 and then returned to B+. In this manner signals passing through tubes 208, 211, and 212 serve to apply a negative potential to the grids of power tubes 215, 216 causing them to conduct less and reduce the current flow through one of the fields 219A of the amplidyne. At the same time the signal from these three tubes applies a positive potential to the grids of power tubes 213, 214 causing them to increase their conduction. This results in increased current flow through amplidyne field 219B. With current in one field increasing and current in the other field decreasing, the torque effect is cumulative. Of course, it will be understood that with no signal present current in the two fields will be substantially the same and their effects will cancel out.

Tubes 213, 216 are biased to a greater degree than tubes 214 and 215. The former tubes do not, therefore, enter into the control action, referred to above, except when excessive deviations of the pile power from the demand level occurs, which results in large error signals which are of sufficient magnitude to overcome the bias. In this way, tubes 213 and 216 act as "helper" tubes for tubes 214 and 215 producing larger current differential in the control windings 219a and 219b of the amplidyne.

It will be noted that relays 220 and 221, are normally energized and they become de-energized when the regulating rod becomes fully withdrawn or fully inserted. For instance, relay 220 is controlled by upper limit switch LS1, and relay 221 is controlled by lower limit switch LS5. When the regulating rod is fully withdrawn, relay 220 becomes de-energized and serves to insert large resistors in the cathodes of tubes 213, 214, and 215, de-energizing these tubes, so that only the "down" helper tube 216 remains in position to control the regulating rod in the downward direction. When it is understood that at this time relay 221 is energized, it will be seen that upon de-energizing tube 220, the armatures thereon fall to back contact position. When the first armature falls to back contact position, the circuit through lead 271 front contact of the first armature of relay 221 and lead 273 is broken, thereby removing the ground from around resistor 273 which brings it in series with the cathodes of tubes 214 and 215, causing them to be de-energized. When the second armature of relay 220 falls to back contact position, it breaks a circuit to ground through leads 274 and 275, thereby inserting the large resistor 276 in the cathode circuit of tube 216, causing this tube to become de-energized. Now, when the regulating rod is fully inserted, relay 221 becomes de-energized which serves to insert large resistors in the cathode circuits of tubes 216, 215, and 214, de-mobilizing these tubes, so that only up "helper" tube 213 remains in a condition to control the regulating rod in the up direction. It will be understood that i this condition, relay tube 220 is energized, so that de-energization of relay 221 breaks a circuit through leads 271 and 272 to ground, thereby inserting resistor 273 in the cathode circuits of tubes 214, 215 which serves to de-mobilize these tubes. At the same time, the second armature of relay 221, upon reaching back contact position, opens a circuit to ground through lead 277 and serves to insert resistor 278, thereby de-energizing tube 213. In the event that some condition arises which permits both relays 220, 221 to become de-energized, it will be seen that a circuit is completed to ground through lead 279, back contact of the second armature of relay 220, and lead 274 to ground. At the same time, a circuit through leads 280 and 281 and back contact position of the second armature of relay 220 grounds the winding of relay 282, thereby causing it to become de-energized and the armature thereof to fall to back contact position. This completes a circuit through leads 283, 284 to ground which serves to ground out the input to tubes 208, 211, and 212, causing the amplifier to cease operating.

Start and run

In starting the pile, the neutron signal at extremely low levels may be indistinguishable from background noise so that shim rod withdrawal must proceed with caution. Paradoxically, in the presence of poison growth, rods must be withdrawn at the maximum safe speed. [The servo will function in response to a level signal to level the flux at $N_L$. (1% of full power.)] Considering that restraints will be placed on the withdrawal of shim rods, the regulating rod will, during the entire portion of the rise to $N_L$, assume a fully withdrawn or "cocked" position. In this state the regulating rod is incapable of dangerous sudden withdrawal and at the same time is "cocked" for maximum corrective action. Protective devices will be capable of acting on both derivative and level danger signals for maximum protection. If a shim rod insertion is required, all rods will be inserted. This phase of a relatively dangerous operation in a state of rising flux requires a grouping of controls which will be designated as the "Start" position.

Having leveled the pile at $N_L$ a second phase of operation, designated as "Run," is entered. Neutron signals are now sufficiently strong so that it may become necessary to operate some of the instrumentation at reduced sensitivity. Since relatively small changes in operating level are now required, shim rod withdrawal may be limited to the function of keeping the regulating rod in range, or may be used for the purpose of manual control. The servo now functions to hold the flux level constant and the level control point becomes manually adjustable. In order that the regulating rod may exert control in both directions, it will now normally be found near the center of its range. Protective devices will respond to the level signals only, as short periods are relatively harmless at high levels due to the proximity of the level protective setting. Shim rod insertion is now a more normal occurrence and ordinarily consists of the insertion of a single rod. The "Run" position covers operation from $N_L$ to $N_F$ (full power), however, most operation will occur in the vicinity of $N_F$. During periods of rapid poison growth (after a shutdown) it will be necessary to proceed as rapidly as possible to $N_F$.

Because of the contrasting demands made of the control system during "Start" and "Run," a transition is provided in order that changes in instrumentation and mode of operation may be made in proper sequence and while the flux level is stationary.

System and mode of operation

In the operation of the system of the invention, where only three shim rods are illustrated, a source of radiation, such as activated antimony, is provided to assist in raising the flux level of the reactor to a point where there will be indication on the count rate meter channel. In this arrangement, it will be understood that the lattice multiplies the source, and the count rate meter records this multiplication and the changes in multiplications. The source may be inserted into the active lattice. The various steps in starting up the pile after reloading, and bringing it to full operating power, will be set forth. At the time of start up, the shim rods are all fully inserted as is also the regulating rod. In the drawings of Figs. 23, 24, 25, and 26, the relays are shown in the de-energized position even though some may normally be energized. The first step is to close the power switch and place the line voltage across the relay KT. Upon energizing this relay, the contact KT–A will close along with KT–C and KT–E while contacts KT–B, KT–H, KT–D, and KT–F will open and this will open the battery circuit. Also, power is applied through the self-synchronous transformer to the shim rod and regulating rod self-synchronous remote indicator. If electrical plugs F, E, D, C which lead to the motor circuits and limit switches are plugged in, and the various key switches located at the various openings and beam holes and generally designated 290 are closed and locked, relay K–101 becomes energized closing contact K–101A for completing the power circuit to the control circuit. Since the shim rods are seated (in their lower seats) contacts 77A, 77′A, 77″A are closed on separate and identical seat limit switches, one of which is illustrated at 77 in Figure 14, heretofore referred to. All shim rods seat lights 230, 231 and 232 and shim rod relays 1KS, 2KS, 3KS are energized since contacts KT–A, KT–C and KT–E are all closed, as indicated above. This has the effect of closing contacts in the withdrawal circuit of Fig. 23c for the shim rods, including contacts 1KSA, 2KSA, 3KSA and sets up the circuit for withdrawal of such shim rods. It also opens contacts in the insert circuit including 1KS–B, 2KS–B, and 3KS–B of Fig. 26a.

Power through contacts K101–A of Fig. 23a also passes through the clutch transformer 323. If the magnets are down touching the shim rods, clutch contacts 1′, 2′ and 3′ are closed energizing relays K51, K52, and K53 and the various clutch lights 233, 234 and 235 are energized. The energizing of these relays closes contacts K51–A, K52–A, K53–A which serve to complete circuits that cause relays K41, K42, and K43 to become energized. The energizing of these latter relays closes contacts K41–C, K42–C, K43–C which apply power to the amplifiers in the magnet control circuit of Fig. 24 for supplying D.C. potential to the magnets.

After this takes place, the next step is to start raising the shim rods and removing the absorbing sections from the pile. At this level of the pile the only instrument which is sufficiently sensitive to detect neutron flux changes is the fission chamber 121 of Fig. 13. It drives the log count rate meter 118, heretofore described, and provides an indication of the counts, that is, pile level, but does not directly indicate the rate of change or period of the pile.

To raise a shim rod, the servo manual control switch S4 is thrown to the first rod position closing S4–2 contact through raise clutch switch S5. This raise clutch switch S5 assures that all of the shim rods are fully inserted so that it is permissible for the servo to come on and the regulating rod to be withdrawn at high speed. Removal of the regulating rod at high speed would occur in response to a large signal, and such action could otherwise scram the pile, except for the arrangement described hereinafter.

The above action completes a circuit including contact S5–3 and places power at point Y, but switch S5 cannot be left in the "raise" position since this would have the effect of scramming the pile through contact S5–2 of Fig. 24. The raise clutch switch S5 is then returned to "off" position to prevent the scram of the pile, but does not result in the loss of power to the amplidyne since the K2 relay seals in power to point Y via the K2–A contact. Power at Y is applied to amplidyne power contactor, energizing the amplidyne. This has the effect of pulling the regulating rod all the way out of the pile, and is also referred to as "cocking" the regulating rod. Movement of the regulating rod to this position actuates switches LS2–2 and LS3–A closing the contacts thereof in the circuit. This completes the power circuit through relays K1 and K3, energizing these relays at the same time the withdrawal-lights 236, 237 come on. The only way to get power over to point N is through the K1–C contact since the S4–1 contact is only closed when servo manual contact switch S4 is in "manual" position and operation at this point is not under manual control. Contact K26–B is closed since it is not in "reverse" condition (see reverse relay S1). At this step there are three possible paths to get to relay K11, or any of the other withdrawal relays. Consideration of the outer path through S5–1 contact may be eliminated at this time. Contact S5–1 is controlled by raised clutch switch S5 and is used in raising the magnets preparatory to taking off the top plug 9.

To energize relay K11 which will cause the first shim rod to be withdrawn, contacts K31–A, 1LSW–1, S21–1 and K41–A in the two remaining paths, must be closed, since they are common to both paths. To withdraw through the circuit including contact K41–A, that contact must be closed. Relay K41 of Fig. 26b receives power through line X' and relay contact K51–A. These latter contacts are normally open, but since clutch to rod contact 1' has been made between the shim rod and magnet, a circuit has been completed through these contacts and relay K51, which serves to energize it. This closes contacts K51–A and energizes relay K41 closing contact K41–A.

Contact S21–1 is closed when the shim rod control switch (one is provided for each rod) S21 is in either the normal or preferred position. It will be understood that before start-up, the switches for shim rods one and three are in normal position and the switch for shim rod two is in the preferred position. The other contacts 1LSW–1 and K31–A are normally closed since the shim rod one is not fully withdrawn (being fully inserted at this time), and since it is not intended to try to insert the shim rod.

The next action is to close contact K4–A. Contact K01–B of Fig. 23b is normally closed since the system is in "Start" condition. This provides power to a timer 225 which may be of the "flex pulse" type manufactured by Eagle Signal Corporation, which intermittently closes the time contacts 122 for a predetermined time, for instance one second out of every four seconds, although, this time interval may be adjusted as desired. This intermittent operation (a) reduces the speed of withdrawal by a factor of ten, and (b) introduces stops in $\Delta K$ so that the transitional period may be isolated. The effect is to introduce a transitional rise in flux which when differentiated by the period recorder and meter circuit will produce large period indication as criticality is approached. Thus, it serves to sharpen up the period indications on the period meter, and recorder, which will assist the operator in his operations thereof, and these transitions can stop shim rod withdrawal before the pile goes critical. This action also closes the circuit to intermittently energize the X–1 relay of Fig. 23b.

If the count rate meter recorder 115 is on scale, and if the period is greater than 7 seconds, and at this point the period is $\infty$, the contacts of the seven second switch 238 of the pile period recorder 98 will be closed and power will be available at point O. If the period is greater than thirty seconds, the contacts of thirty second switch 239 will be closed, and if the speed selection switch S2 is in "neutral," position, contact S2–1 is closed and power will be available down to point P. Further, contacts K41–G, K42–G, K43–G are closed since relays K41, K42 and K43 are energized through the magnet to rod contacts 1', 2', and 3', as explained above. This energizes relay K6 and closes the K6–C contact. If the count rate meter is off zero, that is, if the pile level is sufficiently high to cause it to record, and since the X1–A contact is intermittently closing in response to the closing of contact 122 of the timer 225, power will be made available at point Q when speed selection switch S2 is thrown to the "intermediate" position. This is via the S2–4 contact. Throwing the speed selection switch S2 from the "neutral" to the "intermittent" does not drop out relay K6, because the K6–A contact seals in relay K6. Power at point Q pulls in the K4 relay since the K6–C contact has been shown to be closed. This is not a steady power but will be intermittent due to the action of the X1–A contact. Thus, all the K4 contacts (K4–A, K4–C, and K4–E) of Fig. 23c are closed intermittently, completing the power path to the withdrawal relays K11, K12, and K13. These relays close their contacts which complete circuits in Fig. 25 that supply three-phase 220 volt power to the shim rod drive motors. These motors start withdrawing shim rods intermittently. At this point none of the other meters show any readings since they are not responsive at the low flux levels encountered.

After the pile level rises awhile, the period meter arrangement, including the period channel, begins to show readings. After going through the log N amplifier, the signal is differentiated and the output is a measure of the rate of change of pile power. If, in going up on "intermittent," the pile transient period becomes less than 30 seconds, power is removed from the point P of Fig. 23b by the opening of the contact 239 of the thirty second period switch, maintained on the pile period recorder 98 of Fig. 10, and relay K6 becomes de-energized opening contact K6–C which de-energizes relay K4 and stops the withdrawal of the shim rods. To restore the intermittent withdrawing operation, the speed selection switch S2 must be returned from the "intermittent" position to the "neutral" position. And if the period is now greater than thirty seconds, power will again be applied to point P and relay K6 will again become energized, sealing itself in with the K6–A contact so that the speed selection switch S2 may be returned to the "intermittent" position and then the "intermittent" withdrawing operation will be continued. The above procedure is repeated each time the pile period becomes less than thirty seconds; if this becomes troublesome, the thirty second period contact may be by-passed with the S1–2 contact which is on the S–1 "reverse and bypass" switch located on the console along with such switches as S–2, S–3, S–4, S–5, S–6, and others. However, once the thirty second contact 239 has been by-passed, the seven second period contact 238 will stop the withdrawing action by removing the power from point O when the period becomes less than seven seconds, this latter contact is open on the above recorder, and has heretofore been referred to in the description of Fig. 11.

When the pile power finally reaches the level of $10^{-5}$ $N_F$ or .001% $N_F$, it becomes possible to withdraw all of the rods at high speed, if this procedure becomes desirable. In the alternative, it is possible to remove any one rod at high speed.

Now, if it is desired to start up the pile after it was recently operated at high level and then closed down as a result of a scram or otherwise, it will be apparent that conditions cannot be the same on start up as they were after the refueling operation described in column 23, line 60, column 24, line 17. There will be the condition of residual activity and the problem of xenon poisoning. It may be possible, therefore, to bring the pile back into operation by withdrawing the shim rods at high speed. Thus, if the pile level has not fallen below $10^{-5}$ $N_F$, operation may be restored by withdrawing all rods continuously in the manner herein outlined. When the pile reaches the level of $10^{-5}$ $N_F$, a contact 251 on the log N recorder 97 closes which provides power to point R. Then as the speed switch S2 is thrown to the "high" position, the S2–3 contact is closed, giving continuous power to point Q, energizing relay K–4 continuously, and withdrawing all of the shim rods without interruption. Since the energizing of the relay K4 has previously been described, and its effect on the shim rod withdrawal has been indicated, this operation will, in the interest of avoiding repetition, be omitted.

As the pile level rises, the count rate meter recorder 115 tends to go off scale, stopping the withdrawing action by removing power from point O, since the count rate meter "on scale" contact 240 opens. To obviate this, the fission chamber 121 must be physically pulled away from the reactor. When the pile level reaches $10^{-2}$ $N_F$ or 1% $N_F$, the sag contact on the log N recorder 97 closes energizing relay K03 which closes the K03A contact. At this point the system can be taken out of "Start," and it is necessary to get out of "Start" before getting into "Run" position.

Until the system gets into "Run," the power level cannot be raised above 1% or $10^{-2}$ $N_F$ on servo control. While the system was started with the servo turned on, it was taken up through "Start" manually. When in "Run" and under servo control, it is possible to manually select the pile level control point. If the operator fails to get the system out of "Start" and continues to raise the reactor level as explained above, the control system will produce an automatic insertion of all shim rods when the level becomes greater than 3 $N_L$ by closing the contact 253 of the switch on the log N recorder 97 which is set to close at levels exceeding 3 $N_L$. This automatic insertion is accomplished by completing a circuit which energized the K26 relay through the K02–B contacts and contact 253. The K02–B contact is closed at this time, since the system is in "Start." When the system is taken out of "Start" and put in "Run," the K02–B contact is opened, and the automatic insertion (reverse) of the shim rods is in position in the manner described above.

The closing of contact K03–A permits manual completion of the circuit to the K01 relay when the "Start-Run" switch S03, which is preferably of the button type, is manually closed which takes the system out of "Start." When that is done the K01 relay is sealed in by its contacts K01–A, thereby completing a short circuit across "Start" light 241 causing it to be extinguished. This may be referred to as being "out of Start." The system cannot get into "Run" without following the above procedure, since this action completes a circuit to point S which later provides a path for power to relay K02 as hereinafter described. To complete a power path to the K02 relay from point S, three contacts, representing three different conditions which must be satisfied, are required to be closed. This arrangement is intended to insure that the servo has levelled the pile before the next step of raising the demand level takes place. The conditions to be met are: (a) the period is long, i.e., longer than thirty seconds, (b) the level is $N_L$ as requested, and (c) the regulating rod is partially inserted. The thirty second period contacts 239' on the period recorder 98 will be closed if the pile period is greater than thirty seconds. The $N_L$ contact 242 (1% $N_F$) on the log N recorder 97 will be closed as the pile level is above $N_L$ (1% $N_F$). The circuit cannot be completed unless either the S4–4 contact or the K3–D contact is closed. The S4–4 contact is open because the servo manual control switch S4 is in the servo or rod one position. Contact K3–D is closed only if relay K3 is deenergized. But if the contacts of the regulating rod switch LS2–2 are closed, relay K3 will be energized. These contacts are controlled from the regulating rod, so that when the rod is "cocked," the contacts are closed, and when "uncocked," they are open. It will, of course, be understood that on the previous shutdown, the servo demand level was automatically reduced to $N_L$. This is the lowest level that the servo can be called upon to maintain. In order to get into the "Run" condition, the pile level had beed up to a point slightly greater than $N_L$. This, as previously indicated, closed the $N_L$ contact 242 on the log N recorder 97, and forced the servo to lower the regulating rod to bring the pile level down to $N_L$ which the control circuit was demanding.

This lowering of the regulating rod 25 releases the switch and opens contacts LS2–2, de-energizing relay K3 which closes the K3–D contact. The closing of the K3–D contact completes the circuit to the K02 relay and "Run light" 250 from point S, thereby energizing it. Once it is energized, it closes a sealing in circuit which includes contact K02–A.

Now to raise the level of the pile, it will be noted that the servo level control circuit has two reversible motors, one a fast motor and the other a slow one. They serve to operate the log pot or coarse control 105 of Fig. 12. This is accomplished by selectively coupling the fast motor 224 or the slow motor 226 to the wiper arm of the log pot 105, in any conventional manner so that one motor may operate the wiper to the exclusion of the other. In this way the wiper of the log pot 105 is moved by the selected motor to one extremity referred to as the $N_L$ postion to actuate limit switch 261 or moved to the opposite extremity referred to as the $N_F$ position, to operate limit switch 243, for the purposes indicated hereinafter.

At this stage the coarse control is all the way over to the $N_L$ position and will stay at $N_L$. When the wiper of the log pot 105 has been moved over to the $N_F$ position, the two contacts of single pole double throw micro-switch are operated to close one contact 243A and open the other contact 243–B. This would complete a circuit to turn on the $N_F$ light 222 and would open the circuit 223, preventing further raising of the servo demand level. However, since the servo demand level is at $N_L$ and not at $N_F$, switch contact 243B in the motor circuit 223 is still closed. In addition, the K04–D contact is closed and as the K02C contact is also closed, and further, since the K2–C contact is closed, a circuit can be completed to either the "fast" motor 224 or the "slow" motor 226 upon closing either the S01–1 contact or the S01–3 contact. These contacts are controlled from the servo level control switch which is manually operated, and permits selection of a speed at which the level may be changed to either "fast" or "slow."

It will be noted that contacts K04–D, K02–C, and K2–C are closed. The K04–D contact will be closed if the K04 "set back" relay is de-energized. This condition prevails if the pile level as indicated by the level recorders 90 is less than 1.1 $N_F$, since the contacts 252, 252' on the safety or level recorders are open, as indicated in Fig. 23. The K02–C contact will be closed if the K02 relay or the "Run" relay is energized. Since the system is in "Run," relay K02 is energized. It is necessary to get the K–2 relay energized before the pile level can be raised and power can be supplied to the motors 224, 226. The K2–C contact is closed if the K2 or servo relay is energized. This relay is energized since it has previously been shown that power is present at point Y.

Since power may now be applied to either of the two motors "fast" or "slow" by closing contact S01–1 or S01–3, the operator may close the selected contact for the desired speed.

Now it is desired to raise the pile level to some predetermined point, for instance to 10% $N_F$. This will be done by changing the servo level demand by operating the "fast" motor 224. The regulating rod will move out and assume a position that will cause the pile to rise exponentially on some selected period such as on approximately a seventeen second period. This period is fixed by the constant angular velocity of the contact arm of the log pot 105 which is in the servo input circuit and which changes the level demand in a logarithmic fashion. If the regulating rod, at the beginning of this operation, is so positioned that it will withdraw completely without producing the seventeen second period, the following procedure will be employed to reset the regulating rod by means of shim rod withdrawal. Since the system is in "Run," relay K01 is energized and the K01–B contact, which is open removes power from point O and prevents the withdrawal of shim rods as in the previous operation. However, the K01–C contact is closed, providing power direct to point T. Now if the manual switch S6 is thrown to "up" position, contacts S6–1 and S6–2 are closed. The closing of contact S6–1 causes relay K5 to be energized. The closing of contacts S6–2, if the K26–D contact is closed, causes relay K7 to be energized. The energizing of the K5 relay will close the K5–A, K5–C and K5–E contacts in the withdrawal circuit and the shim rod which has been selected with the selector switch S3 will be withdrawn. Since the K4 relay cannot be energized, the only path for power to the withdrawal relays K11, K12 and K13 must be through the contacts of the S3 switch and the contacts of the K5 relay.

Now, if it is desired to lower the level of the pile to some predetermined point, power must be provided to the "down" windings of either the "fast" or "slow" level control motor.

Assume that it is desired to lower the level at a slow rate. Since the system is not at the $N_L$ limit position on the coarse control or log pot 105, contact 261A of the single pole double throw limit switch located at the $N_L$ limit position of the log pot, is closed giving power to point "U." At the same time the second contact 261–B is open so that the $N_L$ position signal lamp 262 is extinguished. By manually switching the servo level control switch to the "lower slow" position, contact S01–4 is closed completing the circuit to the "down" winding on slow motor 226.

In response to this request for a level change, the servo amplifier inserts the regulating rod, and if the demand is more than the regulating rod can meet, the regulating rod will automatically insert the preferred shim rod and then all shim rods, progressively, as explained hereinafter. In practice, the servo level demand and shim rod insertion are performed simultaneously keeping the regulating rod in the center of its travel.

The next thing to explain is how the regulating rod automatically inserts the "preferred" rod and how the automatic insertion of all rods takes place. First, for purposes of background information, the matter of inserting the shim rods in various ways will be considered. As in the withdrawal circuit, there are a plurality of insert circuits, one for each shim rod. In the embodiment of the control system where only three shim rods are used, there would be relays K31, K32, K33. To insert a given shim rod, its insert relay must be energized. This relay closes contacts which supply power to the shim rod drive motors. Various ways may be employed to insert the shim rods. An insert relay such as K31 may be energized. There are four paths which can be taken to energize the K31 relay. One of these paths, through the S21–4 and K41–B contacts, is only used for the lowering of the magnet, and not for the insertion of the shim rods, but the lowering of the magnet and is not of interest at this time. In addition, there are three other paths of potential interest. One path is completed through the S21–3 contact. Another path is completed through the K26–A contact, and the third path is completed through S6–3 and K27–C contacts, in parallel, and the K21–5 contact.

The S21–3 contact path will be first considered. It will be seen at the S21–3 contact is a contact on the shim rod control switch S21 which closes when this switch is thrown to the "jog" position. The closing of this contact provides power to point V. If the 1KS–B contact is closed, and it should be at this point, since the shim rod is unseated, and if the 1LSI–1 contact is closed, and it should be, since the rod is not at the insert limit, and if the K11–A contact is closed, and it should be, since it is not desired to withdraw the shim rod, relay K31 will be energized. In the explanation of the next two paths, the completion of the circuit from the point V to the K31 relay is identical to the above, and will not be repeated.

Next, the path to the K26–A contact will be considered. The K26–A contact is closed when the K26 or "reverse" relay is energized. Thus, any condition such as the (a) N—1.2 $N_F$ where contacts 227 on the level recorder 90 will close, or (b) period less than 5 seconds which cause contact 244 on the period recorder 98 to close will energize the K26 relay to automatically cause the shim rod to be inserted. Now consider the path through contacts K27–C and S6–3 in parallel, and contact S21–5. The S21–5 contact is a contact on the shim rod control switch S21 which will only be closed when the switch is in the "preferred" position. The S6–3 contact is a contact on the S6 switch (up-down switch), and will close when this switch is thrown to the down position. Thus, the K31 relay may be energized when the shim rod control switch is in the "preferred position," and the up-down switch S–6 is moved to the "down" position. It is only necessary to keep one switch in the "preferred" position to prevent overloading of the inching resistors. The K27–C contact is closed when the K27 relay is energized. The manner in which this relay becomes energized will be explained by considering how the regulating rod gives automatic insertion of the preferred or desired shim rod.

As previously indicated, the shim rods may be automatically inserted by the action of the regulating rod. When the regulating rod drops below its center position, the limit switch contact LS3–B is closed. And since power is available at point Y, the closing of this contact makes power available at point W, since the K2–E contact is closed. Power at point W turns on the "insert" light 245 which serves to signal the operator and inform him that he should start inserting shim rods if the regulating rod is to be brought back or restored to the center position. If he should fail to act or respond to this signal and the regulating rod is permitted to be inserted still further, the LS4–A contact is closed, which places power on point X. The availability of power at point X energizes the K27 relay which closes the K27–C contact and automatically inserts the preferred shim rod. Also, a "preferred" light 246 comes on to warn the operator. If the insertion of the preferred rod is not sufficient to keep the regulating rod from being inserted still further, such regulating rod in its further movement inwardly of the pile will close the LS4–B–2 contact. The closing of this contact will then make power available at point Z and this will energize the K26 or "reverse" relay and turn on the "reverse" light 247, thus inserting all shim rods through the circuits which include contacts K26–A, K26–C, and K26–E. It will be understood that the above discussion merely indicates how the K26–A contact energizes the K31 relay. The K26–C and K26–E contacts energize the K32 and K33 relays, respectively, in the same manner.

If during the normal operation of the reactor, at any given pile level in servo control, the level should in some manner rise to 1.1 $N_F$ or higher, contacts 252 and 252' on the level recorders will close energizing set back relay K04. This relay upon energizing will close contact K04–A which completes the circuit to the slow motor 226 to cause it to lower the servo demand level by adjusting the contacting arm on the log pot 105. This will continue as long as the pile level is greater than 1.1 $N_F$.

In order to rationalize the action of the contacts of the K7 relay, the three-phase power to the shim rod motors must be examined. Upon the energization of the K7 relay, three resistors, one in each of the legs of the three-phase power supply to the motors are unshorted. It will be understood that the inching control circuit was provided for limiting shim rod movement. This places the resistors in series in the line with the motor windings, and, appreciably reduces applied voltage on the windings at the instant of start-up, thereby limiting the motor acceleration but not materially affecting the operation of the motor in the steady state, for the impedance of these resistors becomes small in comparison with the motor winding impedance during normal rotation. These resistors, in the event of normal operation of all motors simultaneously, would reduce the voltage to the point where it would effect their performance, so this is avoided by operating one motor at a time. Therefore, in order to accomplish this, an S6 up-down switch is employed. Movement of the S6 switch to the "up" position closes the S6–1 and S6–2 contacts. The S6–1 contact, upon closing, energizes the K5 relay from the point T where the power has reached. The closing of the S6–2 contact energizes the K7 relay from point T.

The energizing of the K5 relay closes contacts K5–A, K5–C, K5–E. The closing of these contacts will cause whatever rod has been selected by the selector switch S3 to be withdrawn. The energizing of the K7 relay opens the contacts which short the three resistors in series with the 220 volt three-phase supply to the shim rod drive motors. To realize this inching action, the S6 switch is thrown to the "up" position and then immediately returned to the "off" position. However, if not returned, the motor would continue to withdraw the shim rod at a fast speed. At the instant of start-up the motor impedance is extremely low and consequently a very small resistor in series with this motor winding will constitute a very substantial proportion of the whole circuit, and the drop thereacross will materially reduce the voltage impressed upon the motor. When the motor has finally reached its normal speed, the back E.M.F. of the motor will have risen to the point where the impedance of the resistor does not exert a major influence on the voltage to the motor. However, if all three motors were in operation, the current flowing through the series resistors would be of such magnitude as to produce a voltage drop which would drastically lower the voltage and speed of the motors. This condition must be avoided. It can only occur when all shim rod control switches are in the "preferred" position and the shim rods inserted with the S6 switch. Thus, only one rod must be left in the "preferred" position. The only time when "preferred" has any meaning is when the shim rods are to be inserted. It does not enter into the picture when the shim rods are being withdrawn. Further, "inching" would only be used when the system is in manual control and when it is desired to effect a fine or close adjustment of pile power.

Certain conditions may arise which would justify the extreme action of scramming the pile in order to prevent disaster. Since this is an important safety action which must be taken in order to safeguard life and property, it is a particularly important step in pile control operation. As heretofore indicated, the shim rods are held by electromagnets. To scram the pile, it is necessary to release the shim rods by de-energizing the magnets. This may be accomplished in various ways. See Fig. 24. As heretofore indicated, current for the magnets, corresponding to the number of shim rods used, is supplied by electronic units called magnet amplifiers 95. There are preferably two magnet amplifiers for each magnet. Thus, by cutting off the 110 volt A.C. power to these amplifiers, the source of magnetic current for energizing the magnets will cease to function, and the shim rods will be released to fall by gravity into the pile. The 110 volt A.C. power for the magnet amplifiers is supplied from point A. Power to point A is supplied through three contacts in series from a source of 110 volts. These contacts consist of a normally closed contact 248A on the manually operated scram switch 248, and two contacts KSC–B and KSC–D on the KSC or "scram" relay. All of these contacts must be closed to provide 110 volt power to point A. The scramming of the pile may be accomplished by throwing the "scram" switch 248, which has two contacts ganged together, to the scram position. This opens the contact 248A referred to above, and removes the power from point A. There are five different contacts in parallel which can energize the KSC relay. The energizing of this relay opens the two above-mentioned contacts, KSC–B and KSC–D, which remove power from point A. The KSC–A contact seals in the KSC relay through the normally closed contact 248A on the "scram" switch. The above-mentioned five contacts are operated as follows:

(1) The S5–2 contact is a contact on the manual switch S5, which has heretofore been referred to as the "raise" clutch switch. This contact is closed, scramming the reactor when the S5 switch is thrown to the raise clutch position.

(2) The normally open contact 248–B on the scram switch is closed when the scram switch is thrown to scram position.

(3) There are contacts 249A on a D.C. relay 249 of Fig. 10 whose coil is in series with the coil of the number one magnet 96. As the current to the number one magnet becomes excessive, this relay is energized closing this contact and scramming the reactor.

Items (4) and (5) are the same as item (3) except that they are applied to the number two and number three magnets (not shown). The above are called "slow" scrams.

In addition to the above, the magnet amplifiers, upon receiving abnormally high signals from the sigma bus, will reduce the magnet currents to a point where the shim rods are released. These are called "fast" scrams. For instance, a positive rate of change of pile level on a period less than one second will cause the period sigma amplifier output to raise to a level which will cause the magnet amplifiers to release their shim rods. Abnormal signals from any safety chamber will cause the output of its sigma amplifier to rise to a level which will cause the magnet amplifier to release the shim rods. This would be about 1.5 micro-watts.

Upon scramming the reactor, the servo demand level is automatically reduced to $N_L$. When the pile level reaches .1% $N_F$, the contact 285 on the back of the log N recorder 97 opens which de-energizes the K03 relay. When the K03 relay drops out the K03–A contact opens which de-energizes the K01 relay and turns on the "Start" light. The de-energizing of the K01 relay opens contact K01–A which removes power from the point S. The removal of power from point S drops out the K02 relay. The dropping out of the K02 relay closes the K02–D contact, and this completes the circuit to the down-winding on the "fast" motor in the servo-level control circuit. Thus the servo-level demand is driven down until the log pot or coarse adjustment 105 activates the $N_L$ limit switch 261 which opens contact 261–A, shutting off the power to the down-winding.

*Position of instruments*

No specific showing of the positions of the various instruments such as the parallel plate ionization chambers, compensation ionization chambers, fission chamber and other detectors has been made in the drawings for the reason that these positions may vary with different types of reactors and could vary even within the same type of reactor. However, for general information, it may be pointed out that the parallel plate ionization chambers for the safety circuits may be located around the outside of the reactor tank in the graphite reflector or the concrete shield surrounding the tank. The parallel plate ionization chamber for the servo-system may be similarly located adjacent the tank and external thereto. The compensated ionization chamber for the log N and/or period channels may preferably be located in one of the beam holes such as 66 or 290, indicated in Figure 16. This same location is also suitable for the compensated ionization chamber that provides the galvanometer signal. The fission chamber may be either located in a suitable box or container adjacent to and externally of the reactor tank where it may be moved towards and away from the reactor, or it may be inserted in one of the several beam holes such as 66 or 270 of Figure 16.

It will be understood that the location of these instruments with respect to the active portion of the reactor, as indicated in the preceding paragraph, is only illustrative and is not intended to be in any way restrictive because these instruments may be positioned in any suitable manner for best results in the operation of the particular reactor under consideration. It will be apparent that the selection of the locations will thus vary with the characteristics and desired objectives of the particular pile.

Having thus described our invention, we claim:

1. A control system for high flux reactor comprising a neutron induced chain reacting pile having an active portion, a neutron absorbing control rod disposed for movement within the pile to affect small changes in the reactor activity, a neutron absorbing shim rod disposed for movement within the active portion of the pile to affect substantially greater changes in the reactor activity than said control rod, electromagnet clutch means suspending the shim rod in the reactor, motor driving means for inserting and removing the shim rod from the active portion of the pile, a source of electrical power, a neutron level detector disposed within the pile and producing a signal proportional to the neutron level, means responsive to said neutron level for producing a signal proportional to the period of the reactor, means responsive to the neutron level to vary the position of said control rod, a first circuit means having separate inputs connected to the level signal and period signal and operable to de-energize the electromagnet and release the shim rod into the reactor pile at a predetermined reactor level and at a predetermined reactor period, a second circuit means having separate inputs connected to the level signal and period signal and operable to connect the motor drive means to the electrical source to move the shim rod into the reactor pile at a predetermined reactor level less than the level set for the first circuit means and at a period greater than the period set for the first circuit means.

2. The reactor system as described in claim 1 wherein means is provided for varying the position of said control rod within the reactor in response to charges in the reactor neutron level to maintain a constant neutron level set by a demand control signal source, and third circuit means operably connected to reduce the demand signal at a predetermined reactor neutron level in between the predetermined levels for said first and second circuit means and thereby affect a decrease in reactor neutron level before a scram condition occurs.

References Cited in the file of this patent

UNITED STATES PATENTS

| 2,781,308 | Creutz et al. | Feb. 12, 1957 |
| 2,831,806 | Wigner | Apr. 22, 1958 |
| 2,843,543 | Christy | July 15, 1958 |

OTHER REFERENCES

United States Atomic Energy Commission AECD 3065, High-Power Water Boiler, September 19, 1945, pages 10–22, 34–44, 50–54.

U.S. Atomic Energy Commission ORO-33 Program Administration and Installation Design of the Nuclear Reactor Project at North Carolina State College, July 5, 1950. Pages 28–36, 52–55.

U.S. Atomic Energy Comm. AECD 3163, Automatic Control of Power Reactors by M. A. Schultz, November 6, 1950 (40 pages).

Breazeale–AECD-3435, U.S. Atomic Energy Commission Document, dated April 15, 1952, declassified August 13, 1952; pages 1–24.

"Nucleonics," February 1953, T. E. Cole, pages 32–37.

---

UNITED STATES PATENT OFFICE
CERTIFICATE OF CORRECTION

Patent No. 2,985,574             May 23, 1961

Henry W. Newson et al.

It is hereby certified that error appears in the above numbered patent requiring correction and that the said Letters Patent should read as corrected below.

Column 2, line 57, for "he" read -- the --; column 16, line 30, for "colunm" read -- column --; column 19, line 48, for "whereby" read -- thereby --; column 21, line 6, for "throughout" read -- through --; line 36, for "a", second occurrence, read -- as --; column 27, line 57, for "beed" read -- been --; column 29, line 50, for "at" read -- that --; column 34, line 2, for "charges" read -- changes --.

Signed and sealed this 9th day of January 1962.

(SEAL)
Attest:

ERNEST W. SWIDER             DAVID L. LADD
Attesting Officer              Commissioner of Patents

UNITED STATES PATENT OFFICE
CERTIFICATE OF CORRECTION

Patent No. 2,985,574  
May 23, 1961

Henry W. Newson et al.

It is hereby certified that error appears in the above numbered patent requiring correction and that the said Letters Patent should read as corrected below.

Column 2, line 57, for "he" read -- the --; column 16, line 30, for "colunm" read -- column --; column 19, line 48, for "whereby" read -- thereby --; column 21, line 6, for "throughout" read -- through --; line 36, for "a", second occurrence, read -- as --; column 27, line 57, for "beed" read -- been --; column 29, line 50, for "at" read -- that --; column 34, line 2, for "charges" read -- changes --.

Signed and sealed this 9th day of January 1962.

(SEAL)  
Attest:

ERNEST W. SWIDER  
Attesting Officer

DAVID L. LADD  
Commissioner of Patents